United States Patent [19]
Howie et al.

[11] Patent Number: 5,093,794
[45] Date of Patent: Mar. 3, 1992

[54] JOB SCHEDULING SYSTEM

[75] Inventors: George R. Howie, Greenwich; Paul T. Weisser, Jr., South Windsor, both of Conn.

[73] Assignee: United Technologies Corporation, Hartford, Conn.

[21] Appl. No.: 396,882

[22] Filed: Aug. 22, 1989

[51] Int. Cl.⁵ .............................................. G06F 15/46
[52] U.S. Cl. ..................................... 364/468; 364/194
[58] Field of Search ........ 364/468, 194, 200 MS File, 364/900 MS File

[56] References Cited
U.S. PATENT DOCUMENTS

| | | | |
|---|---|---|---|
| 4,383,298 | 5/1983 | Huff et al. | 364/200 X |
| 4,580,207 | 4/1986 | Arai et al. | 364/900 X |
| 4,661,912 | 4/1987 | Imanishi | 364/468 X |
| 4,852,001 | 7/1989 | Tsushima et al. | 364/468 X |
| 4,896,269 | 1/1990 | Tong | 364/194 X |

Primary Examiner—Thomas M. Heckler

[57] ABSTRACT

An improved job scheduling system provides for scheduling of a variety of jobs without special purpose coding by the use of time maps to maintain current data, including the preferred path through the shop, as well as scheduling jobs around bottleneck shop resources in a dynamic manner.

11 Claims, 19 Drawing Sheets

A Constraints Known a priori

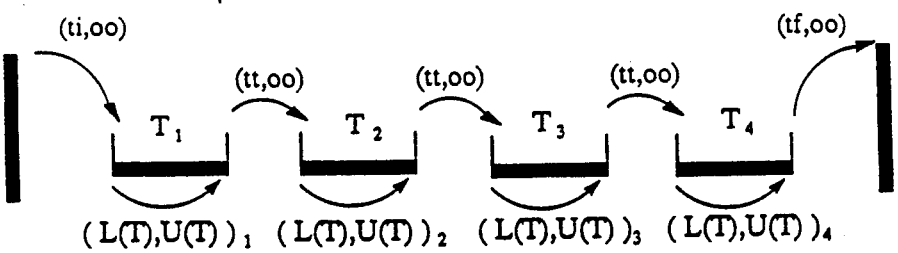

B Assumptions Made for Processing Durations and Release and Want Dates

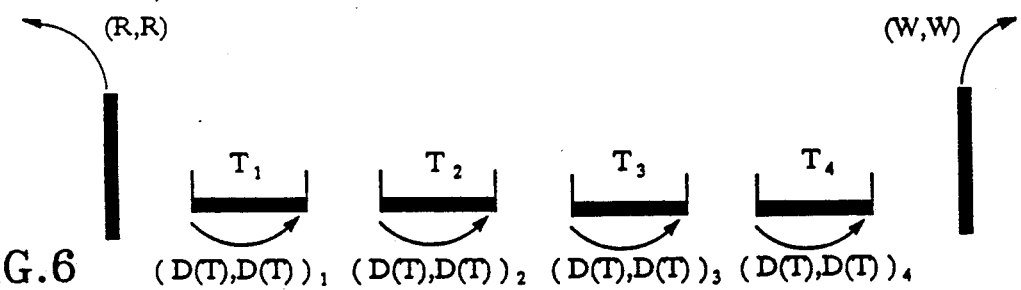

FIG.6

C Final Work Order Representation

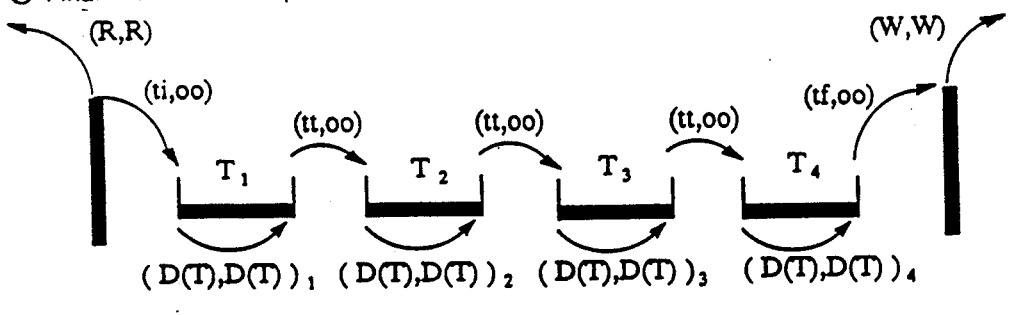

R = Release Date
W = Want Date
ti = initialization time for work order
tf = close-out time for work order
tt = travel time between operations
Ti = an operation D = duration of operation
L = lowest expected duration
U = highest expected duration

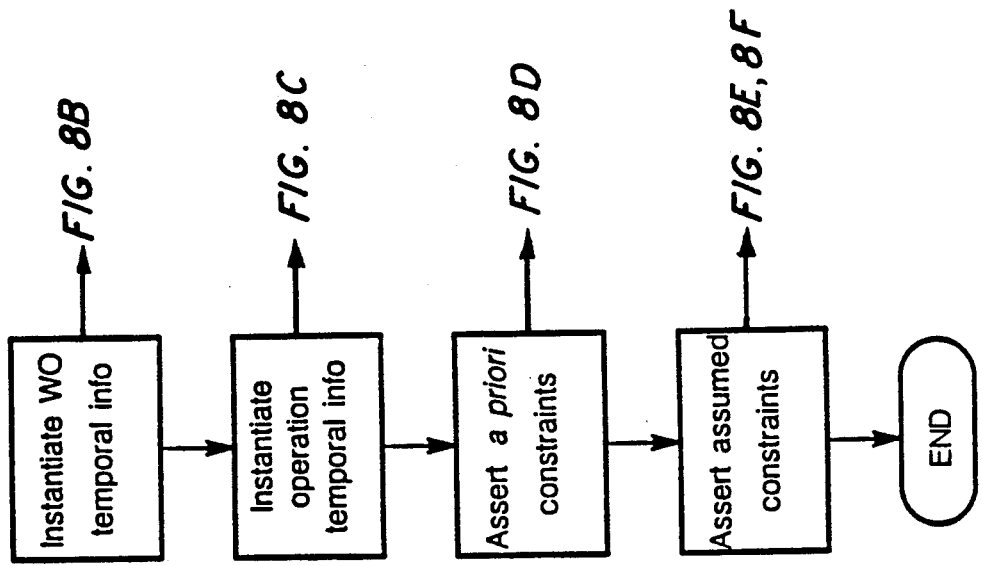
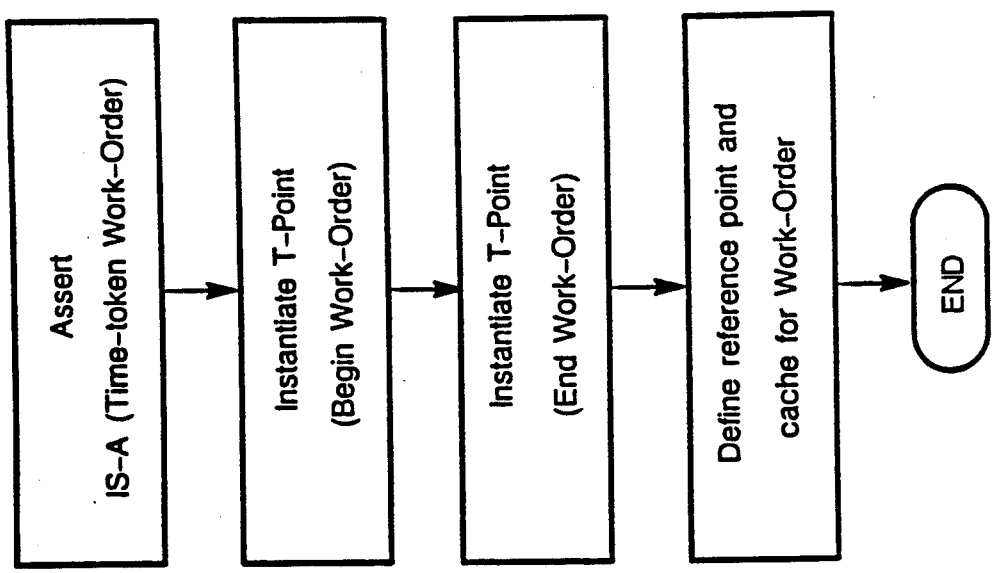

FIG.15B

WOM: (Possible-slot Operation-24 $Slot)

Broker:
If  (Machine-required $Task $Machine)
    (Operator-required $Task $Operator)
    (Time-token (and (Available $Machine)
                     (Available $Operator)) $Token)
Then (Possible-slot $Task $Token)

JOB SCHEDULING SYSTEM

TECHNICAL FIELD

The field of the invention is that of distributed problem solving, in particular a distributed, capacity constrained scheduling system that schedules a series of operations on greatly varying jobs typically having small production quantities and subject to constraints in a finite capacity environment. The essential functions of the system are to estimate the potential completion times of work and to subsequently schedule that work.

BACKGROUND ART

It has been found that a workpiece moving through a job shop, one in which small orders are scheduled independently of one another, as contrasted with a production shop in which production runs are much longer and more repetitive in nature, spends a small fraction of its time actually being operated on, perhaps 10%. The remainder of the time is spent waiting its turn for the next operation. The benefits of improvement in inventory costs and shop throughput are thought to be potentially very large, but efforts to date have had only limited success in handling the very difficult computational problems associated with scheduling.

Extensive work has been done on this problem, some of which is summarized below:

In the Integer Programming approach, characteristics of routes (like set-ups and lead times) and interactions between routes (like capacity and lot-size) are represented using integer variables. Though integer programs provide powerful models, they require detailed information up front and are computationally intractable for large scheduling problems.

An approach known as Hierarchical Decomposition of Integer Programs is an extension of linear programming which decomposes the problem into two stages: a higher level capacity balancing stage and a lower level route sequencing stage. This approach requires forecasts of capacity requirements up front and usually assumes fixed lead times. This approach is based on infinite capacity.

Simulation techniques allow detailed modeling of the shop under dynamic conditions. They provide a good assessment of release and lot-sizing strategies but fail to regard the schedule with respect to performance measures (for instance, tardiness). With no performance measures it is difficult to assess improvements when making operational decisions.

MRP (Manufacturing Resource Planning) is characterized by infinite capacity backward scheduling. More recently, extensions have provided incremental revisions to the plan based on changes in capacity. But MRP does not alter lead times dynamically based on changes in lot sizes and capacity. This tends to produce highly inflated lead times. An advantage of MRP for large manufacturing enterprises is excellent database support and the corresponding ability to communicate the plan throughout the organization.

Queuing Simulation—Queuing models are good at predicting throughput based on static forecasts of demand. They do not seem appropriate in shops where demand and shop conditions are unpredictable.

OPT, a commercial program available from Synchronous Manufacturing, is a finite scheduling system which focuses on critical shop resources (typically bottlenecks) to constrain capacity. OPT attempts to decrease inventories and increase throughput based on changing lead times. However, OPT cannot be easily extended by its users and thus provides limited 'seat of the pants' decision support.

DISCLOSURE OF INVENTION

The invention relates to an improved shop scheduling system referred to as the Cooperative Scheduling System (CSS) in which a central routine, the Work Order Manager (WOM) interacts with a set of subroutines representing shop resources comprising one or more machines to first set a planned schedule allowing for finite shop capacity at "bottlenecks" in a planning mode and then, in an operational mode, to correct and modify the schedule to accommodate for inevitable delays, machine breakdowns, changes in priority, etc.

In any shop, the life cycle of an order is characterized by continually increasing knowledge and changing assumptions about fabrication, capacity, demand and management priority. Due to this, the execution of promises and schedules vary from those originally planned. In an experimental shop, variations can be dramatic since exact fabrication and resource needs are not known until the job is complete. Planning capability is, of course, essential to making good promises but it is also necessary to provide tools to react to conditions which cause variance from the predicted schedule. Accordingly, the system provides two modes: a planning mode for predicting schedules and an operational mode for reacting to changing conditions.

Planning Mode—The planning mode produces an estimated target date for each work order and operation within the work order and feeds those dates to the work order tracking system.

The goal in planning is to make a feasible promise based on the customer's want date, resource capacity, and the throughput desired by the shop. The essential ingredient to meet this objective is that schedules for each work order, and consequently its routes, be measured against the goal. This requires that the "goodness" of each possible schedule for a work order be measured in some quantifiable term; this quantifiable term is generally called the objective function and in Cooperative Scheduling it is the weighted tardiness function. Many functions may be used for this purpose. The one employed in this embodiment is the sum of the product of the priority and the square of the number of late days.

Planning mode must produce these estimates as constrained by resource capacity. In Cooperative Scheduling, the philosophy that throughput should be throttled by the most critical shop resources is adopted. Planning mode uses this assumption to constrain schedules by identifying the critical shop resources and scheduling all routes that pass through them first. Bottlenecks may be identified by stored data in the database, by operator input, or by the system itself dynamically classifying resource centers as bottlenecks in response to the projected load. All other schedules of work order routes are then constrained by the capacity for the critical resource for which a schedule is already determined.

Planning mode also considers relationships among work orders. Work orders which are part of the same project may be combined in work order packages. These packages are used to determine critical paths in the work order relationships. This ability then leverages initial priority decisions; work orders outside the critical path will typically be given a lower initial priority.

A job is entered along with a sequential list of the operations to be performed on the workpiece; the list is displayed to an operator along with a first list of time windows (earliest start-latest completion) for the various steps that is automatically generated from stored process information. This information will be derived from a time map to be described later.

The list may be interactively updated by the operator to accommodate scheduling through shop bottlenecks by imposing tighter constraints (later start and earlier end) on the bottleneck operations.

The time windows in the initial analysis are transmitted to another routine, called a Resource Broker (BRO), that returns at least one "bid" for each step. A bid is a target start and complete time within the "window" set by the WOM. The bids are generated with regard to the finite capacity and previous scheduling commitments of the resources.

The WOM accepts one of the offered times for each step, thereby establishing the final planned schedule, having some slack time between the completion date of step n and the start time of step n+1.

Operational Mode—Operational mode uses the weighted tardiness measure established in the planning mode to support decisions in the short term. There are two types of decisions which must be supported: releasing decisions and reacting decisions.

Releasing decisions answer the question: what job should be released next to this work center? Planning mode produces a list of work predicted for each work center. At execution time, this list is sequenced according to the weighted tardiness measure; the route which will contribute to an on time shop the most goes first.

Reacting decisions are made when new information affecting a planned schedule is received or when assumptions have changed. Most reacting decisions involve reordering the list of work to be done in the best way. Again, the best way is measured according to the weighted tardiness measure.

In the operations mode, the broker routine reacts to an input delay in the start time because the part has been affected by a schedule change in an earlier fabrication step to adjust the start time and still meet the target start time for the next operation. If this is not possible, the BRO routine will notify the WOM, which will, in turn, call the next BRO routine on the schedule for that part to see if it can use its slack to accommodate the remaining delay. The effect of a delay thus ripples along the list of steps until it is absorbed or until the system fails to make adjustment.

The priority decisions as to which of the waiting jobs will be done first is made by use of the weighted tardiness function described above, which computes for each waiting job, its completion date and selects the job that will increase the total delay in passing through the shop by the least amount.

A feature of this invention is that both the final scheduling decision and the first attempt at schedule recovery are: "delegated" to the BRO routines, which may be running on local workstations within an overall network.

Another feature of the invention is that a time map is generated for each work order parts and accessed by the WOM in the course of scheduling.

The time map carries the work order scheduling information; is updated to reflect changing circumstances; and may be accessed by an operator such as a shop manager and/or a work center foreman to display current information and to answer "What if" questions that show the consequences of alternative actions.

Other features and advantages will be apparent from the specification and claims and from the accompanying drawings which illustrate an embodiment of the invention.

BRIEF DESCRIPTION OF DRAWINGS

FIGS. 6a, 6b, and 6c illustrate a simplified time map of a work order.

FIGS. 15A and 15B illustrate different routines that respond to a call from the Work Order Manager.

BEST MODE FOR CARRYING OUT THE INVENTION

Figure 1:
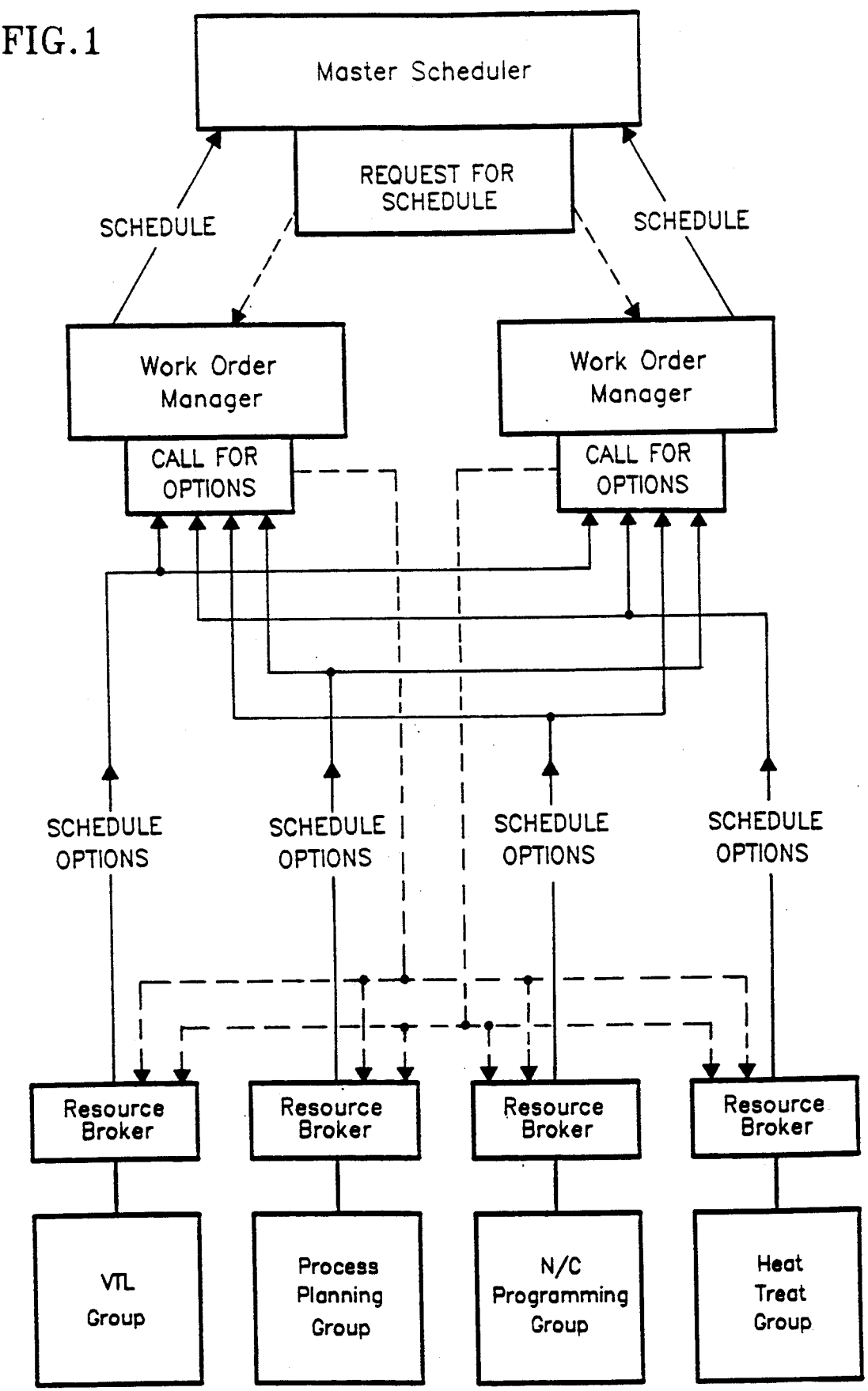
FIG. 1 illustrates an overall block diagram of the system.
Figure 2:
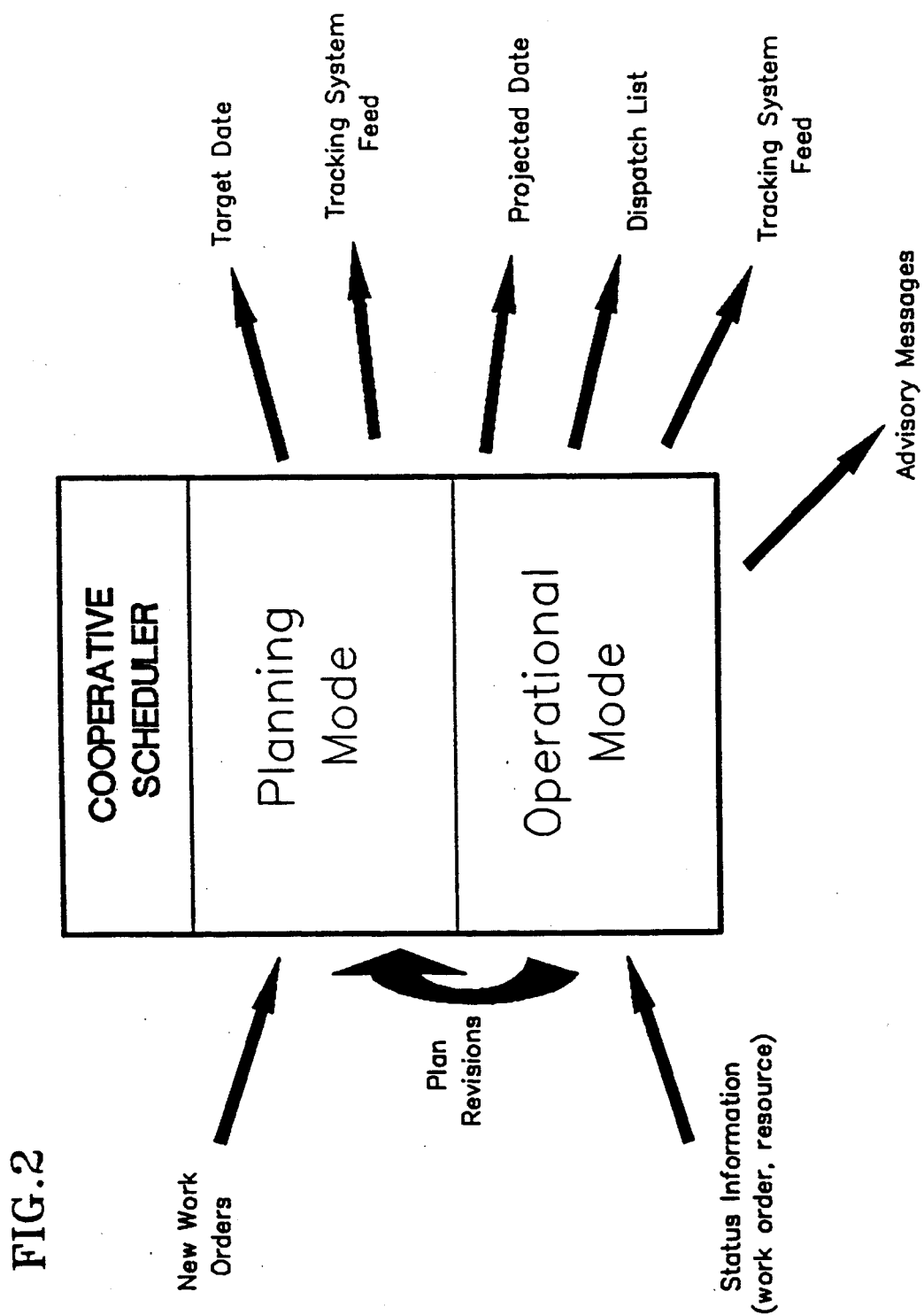
FIG. 2 illustrates the different operating modes of the system and the data flow.
Figure 3:
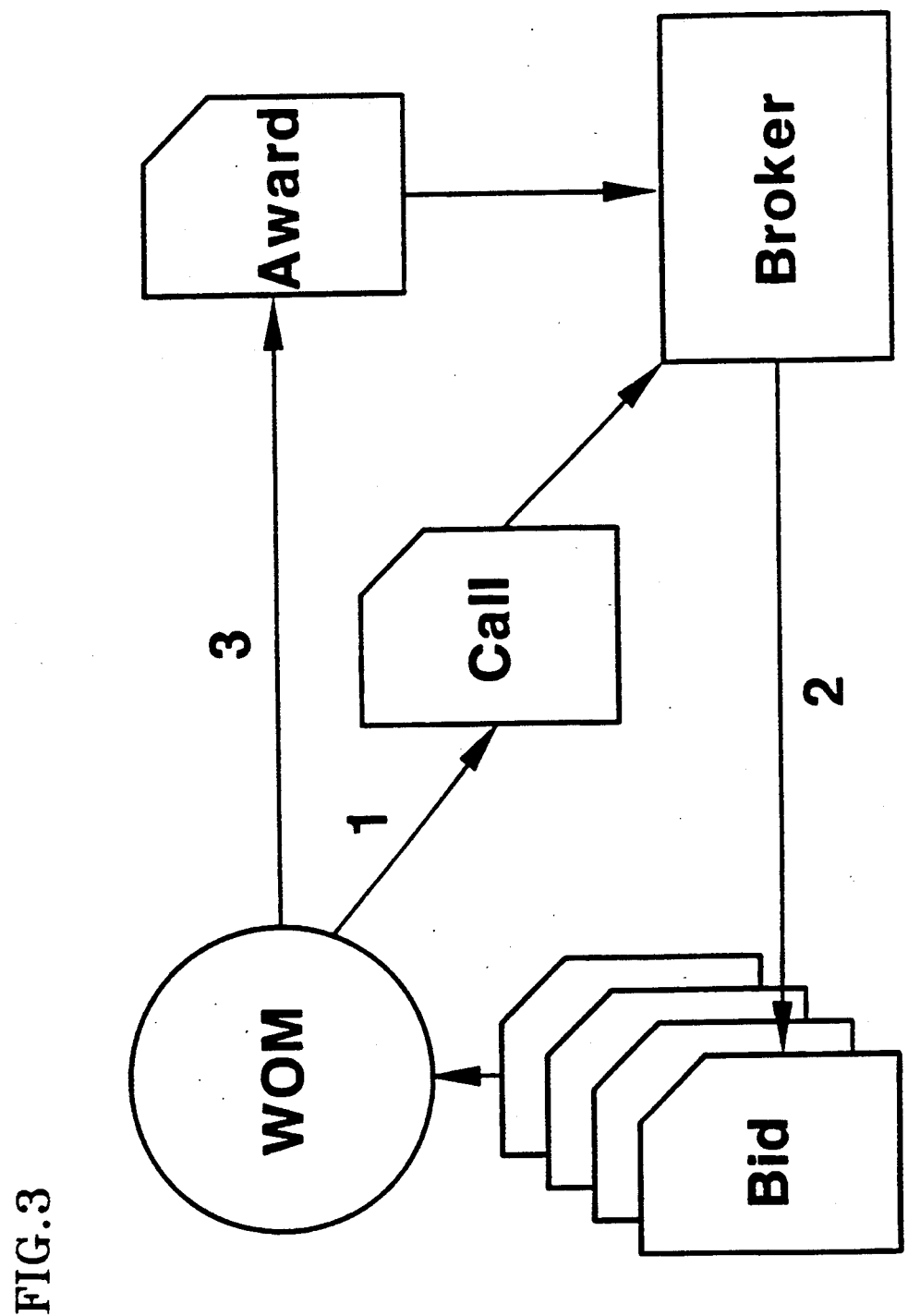
FIG. 3 illustrates the data flow between the WOM and the Broker routine in planning mode.

Referring to FIG. 1, there is shown a block diagram of the overall system. The top block, referred to as the master scheduler, is the overall driver program that communicates with the others. This central point is a convenient place to enter global parameters such as, the priority of different classes of jobs, the rules governing priority and both on the overall shop level and within a smaller group referred to as a resource. Conventionally, the standard priority is to meet the due dates that have been assigned to an individual job. Other priorities, such as reducing the amount of work in progress, may also be implemented. Different priorities and goals may be assigned to different areas of the shop at this central point.

One of the main functions of this block is to provide control, either manual or automatic, for problems that cannot be handled by lower levels. A common example will be those in which the shop is overloaded and not all due dates can be met. The set of jobs that are affected, i.e., delayed, by a change to make a high priority job come out on time is referred to as the conflict set. In a case where a high priority job has bumped other jobs, the conflict set will be passed to the master scheduler which will then rearrange and arrange for the rescheduling of the jobs. This may be done, for example, by setting relative priorities for the jobs and then passing that information down to the work order managers for automatic rescheduling in light of those priorities.

This central point is also a convenient place to present to the person responsible for the shop qualitative information, such as, a rough estimate of the length of time for a job, so that a customer's inquiry may be responded to by someone having access to this overall program.

The master scheduler supports the following seven functions in the planning mode:
1. Setting the Scheduling Horizon, which is the time for which CSS plans schedules.
2. Identifying critical resources and capacity bottlenecks.
3. Assigning work orders to the proper work order managers.
4. Assigning resources to the proper resource brokers for finite scheduling.
5. Providing an outlook reflecting the optimism of the shop manager regarding the ability to meet schedules based on known shop conditions may be provided.
6. Passing information about appropriate strategies to the work order managers and resource brokers.
7. Recommending that another shop be used when no capacity exists for incoming work.

The scheduling horizon will typically be the shop lead time but may be any period of time which the scheduler chooses. The shop manager may set the scheduling horizon through a menu provided by the user interface of CSS with the aid of capacity charts, etc. The outlook reflects the shop manager's expert opinion about the ability of the shop to meet due dates generally. The outlook is entered through the user interface as a fraction between 0 and 1. This outlook is then used in generating schedules as a measure of optimism. Simply, if the shop manager is pessimistic, the work order manager will assume it will take longer to do the job.

The shop manager knows about these policies and goals and through his expertise may know how a work order manager or resource broker should go about its task to contribute to them. The shop manager can provide this knowledge through strategies. For instance, if the policy is to reduce inventories, the master scheduler can impose a "minimize wip" (work in process) strategy on a work order manager. But since the overall objective is to get the job out on time, the strategy may be "minimize tardiness first and then minimize wip."

Strategies are built by the shop manager through the user interface editing screens and may later be selected dynamically through other screens provided by the interface. Strategies may be selected globally, per work order, or per work center as deemed appropriate by the shop manager.

The next level down is that of the work order manager routines, which may be a single routine operating on different data or may be a set of different data structures or data objects. For the purposes of this application, the word "routine" or "means" in the appropriate context will mean a routine, data structure or object, depending on the language that is used to implement the invention. In a distributed computing environment, there may be several routines operating in parallel.

The work order manager has the task of arranging for the scheduling of a work order, which is a series of tasks to be performed on a part or on a set of parts. Often, a project or piece of equipment will require a number of parts that are related in that they must all be finished before the system can be assembled. The work order lists will be grouped in a work order package and dealt with as a unit, in order to identify the critical path for the package, so that some parts do not need to wait longer than necessary for the others.

The work order manager starts out with an order from a customer for a part or parts. It accesses the data base to pull out the standard list of tasks and processes required for such a part (or accepts as input the list of processes and associates them with standard times. It then sends out calls, which are a set of parameters, to the relevant resource brokers which handle the machines that can perform the operations on the standard list. These parameters specify the desired start date and finish date of each operation, and also, the standard process time, which the operation is assumed to take. These dates are set with a large enough margin so there is a reasonable chance of finding an open slot on a machine within that window. Each broker then searches the data base to find the parameters of the part, such as the physical size and so on to select which of the machines it controls that can be used. The broker then scans the time reservation list for each machine to find at least one open machine window, either on one machine or more than one machine. The broker formulates bids that contain the proposed start and finish times for the operation and an indication of the cost of this option in terms of weighted tardiness. Cost accrues both from the tardiness of the operation to be scheduled and the impact that scheduling this operation has on previously scheduled work. The broker selects bid windows to be returned to the WOM according to a local strategy that may not be the same as the global strategy. Typically, the local strategy is to minimize the weighted tardiness function which is a calculated quantity which measures the impact of delay of this part on the total shop throughput. The work order manager then scans through the list of bids from each broker and selects a set of award windows (one window for each operation) that will do the job. The choice will be governed by the global strategy which is usually getting parts out on time.

Figure 7:
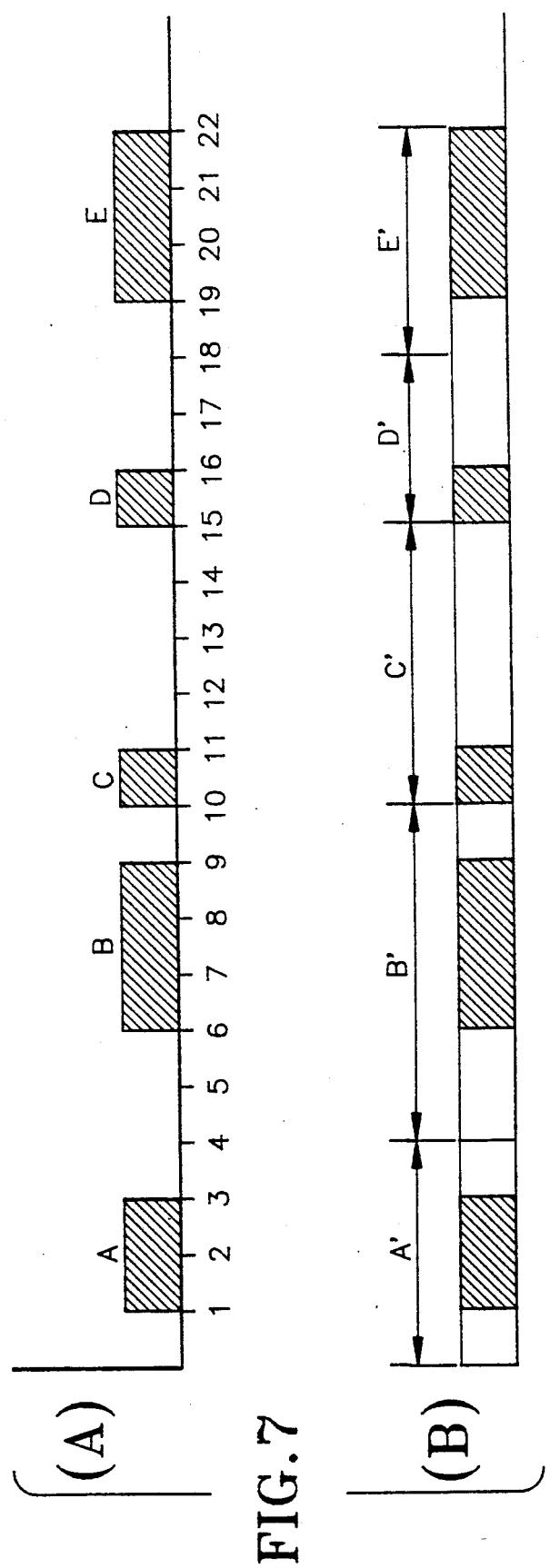
FIG. 7 illustrates a time-map path and the "window" allocated to different operations.

The work order manager then allocates the slack time, which is the time between scheduled job operations, to the different brokers. An example is illustrated in FIG. 7 showing on the first line a set of five operations A-E having different bid windows in which they could be performed over a period of twenty-two days. The actual processing time for each operation is not indicated on this Figure but will be considerably shorter than the open windows. The lower line referred to as B illustrates the allocation of slack, the final window is called the "contract window." This window provides the broker with information about the earliest and latest times the operation can be run given the scheduled times of its predecessor and successor operations. This information is useful in operational mode. In this case, operation D is a bottleneck operation so that it is extremely unlikely that D will be performed earlier in time than is indicated on FIG. 7 and is quite likely to slide to a later time. Thus, the window D' is skewed to a later time. The window C' is also skewed to a later time, since it is not likely at all that it will be possible to move operation D up in time. The significance of this slack allocation will be explained later. The work order manager also compares the total start and finish times to the initial assumptions when the order was accepted. Quite often, it will be found that it is not possible to meet the due date that was promised. This is a common situation in which the order takers or sales people tend to be optimistic. In the particular case of bottleneck operations, they invariably slide and are delayed. If the due date cannot be met, the simplest thing is simply to report failure, i.e., that the job will be delayed. As an alternative, the system is capable of having the work order manager instruct the resource brokers, some or all of them, to drop low priority jobs from their schedule and then to reschedule the higher priority jobs.

When an operational event (also referred to as a shop event), such as a machine breakdown, sick machinist, etc. occurs, there are potentially hundreds of operations affected. This is the conflict set. The master scheduler must direct work orders from the conflict set back into CSS for automatic rescheduling or bring them to the attention of the shop manager.

Project Trade-offs—when a conflict occurs that cannot be handled locally by a resource broker or WOM and also cannot be rescheduled by the system, it is likely that there are two projects that together exceed the shop capacity. In this case, the shop manager will have to intervene to assign greater priority to one project.

Transactions are the basic information packet transmitted between CSS components. Transactions contain the identification of the sender and receiver, a sequence number and other data items required to ensure communications integrity. Transactions have a "content" and a "type" that determine their meaning and communicate the intent of the sender to the receiver. Depending on their content and type, transactions represent calls, bids, and awards, as well as other queries or assertions communicated through the system. The transaction types are: initialize, shutdown, query, assert, receive response, and evaluate.

The representation language and the temporal reasoning utility provide a language in which queries can be expressed throughout CSS. The format is similar to the pseudo first order predicate calculus language used in Prolog. Typical queries are expressed as a list whose first element is a predicate and whose remaining elements are terms. Inference is performed on these queries by backward chaining. An important extension to the reasoning typically done in expert systems is that the queries allowed in CSS are temporal in nature; they mention and reason about time explicitly, using the time map representation described below. The query language is supported at many levels throughout the system: queries can appear in rules, in program code, or they can be entered through the developer's interface. Queries also appear as the content of transactions as discussed above.

Figure 15A:
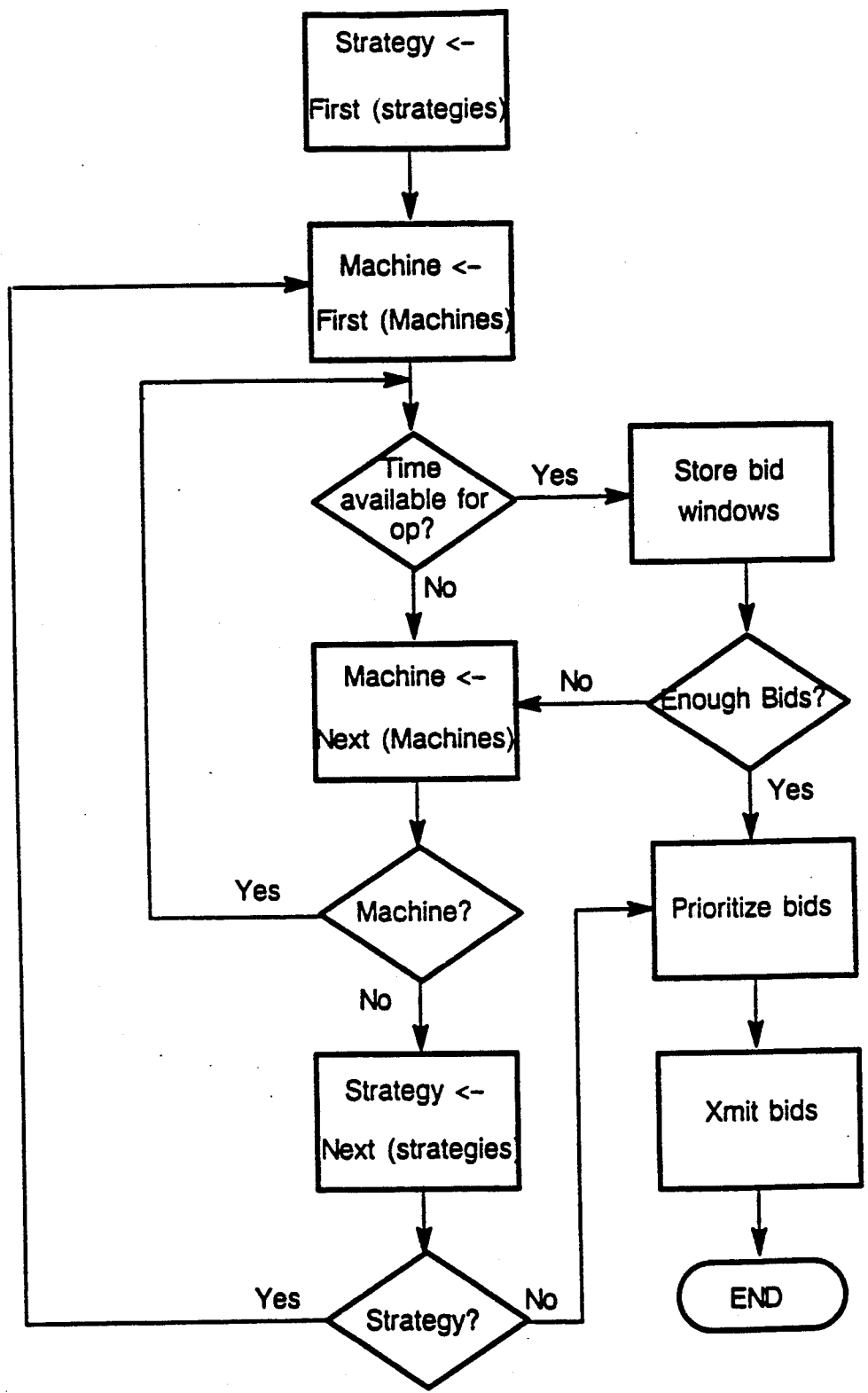

The system may use a standalone, local, finite scheduling resource broker as illustrated in FIG. 15A or a more general rule-based object that employs an inference engine to apply a set of rules. The advantage of this latter approach is that artificial intelligence techniques may be used to translate the expertise of experienced managers to the system.

The system will employ a routine to calculate the weighted tardiness measure or other figure of merit for the schedule. In the preferred embodiment, Lagrangian Relaxation techniques, a well known variety of mathematical modeling, were employed to quantify the effects of capacity constraints on the schedule. Less coding may be expended if a simpler technique were used, such as summing the tardiness function calculated separately for different work orders, rather than using the Lagrangian technique to calculate an optimum change for the whole set of affected work orders.

Due date performance is measured by the difference between operation due dates and scheduled operation completion date. Provision is made to weight job lateness by the relative importance of the job and to place a higher price on a job as its lateness increases.

Determination of the price (which is measured in days, rather than dollars) is directed by four constraints:
1. A precedence constraint forcing work order operations to be performed in sequence.
2. A resource constraint ensuring that resource usage cannot exceed capacity limits.
3. A time constraint that requires a work order to arrive at the operation before the processing of that operation can begin.
4. A time constraint that an operation takes a prescribed amount of time to complete.

The prices determined by the weighted tardiness function are saved in the knowledge base so that decisions in the operational mode can be made in light of these prices. Prices are saved for each resource type and each work order route.

The WOM can schedule work orders according to different goals:
1. Schedule Around Bottleneck—Bottleneck work centers which the master scheduler has identified are scheduled first and the rest of the work order is scheduled around them. To schedule the bottlenecks, the WOM identifies all unscheduled work orders that go through a bottleneck workcenter. All of the work orders that pass through the same bottleneck are gathered together and scheduled through the bottleneck at once using optimization. Conflicts generated by this process can be automatically renegotiated, manually renegotiated or left unscheduled. After the bottleneck operations have been scheduled the remaining operations are scheduled around them.
2. Reduce Lead Time—Work orders are scheduled to finish as soon as possible.
3. Reduce Lead Time and WIP—First, the WOM reduces lead time on the job and then compresses the release times of the upstream operations to reduce the WIP.

No matter what the goal, the call-bid-award communications work the same way. Handling of various goals occurs in the selection method invoked when bids are returned.

When the resource brokers are unable to return bids within the call window the WOM must generate a recovery action. Options are:
1. Leave the work order unscheduled. If most of the operations have failed to schedule, the work order should be left unscheduled and brought to the attention of the shop manager.
2. Commit to the operations which have acceptable bids and leave the remaining operations unscheduled. This option may be preferable when most of the operations have received acceptable bids.
3. Renegotiate the failing operations allowing more impact on the schedule. This option applies to very high priority jobs.
4. Modify or relax constraints. The WOM can ask the master scheduler to relax the release or want date of the work order. This change may affect other work orders in the work order package.

A bottleneck resource is defined as any of the following:
a) A resource at or over 100% capacity for a period of time in which capacity on that resource is demanded by new or ongoing work.
b) A point where many part numbers come together for processing or assembly.

c) A point from which routes commonly diverge to many different parts of the shop.

d) A resource which has particular desirable characteristics and is often in high demand.

Overall capacity is constrained by the capacity of bottleneck resources. In other words, the shop can never finish work orders at a faster rate than the bottleneck can finish operations, given that the work order passes through the bottleneck. The master scheduler analyzes the set of work orders to be scheduled and the current bottlenecks to determine if any work orders pass through the bottlenecks or if new bottlenecks are created. The master scheduler then performs the following steps: a) packages the bottleneck work orders; b) passes the work order package to a work order manager which computes quick, roughcut schedules for non-bottleneck routes in those work orders; and c) selects a strategy to guide the work order manager in negotiation with the resource brokers which manage the bottleneck workcenters.

Depending on the configuration of the CSS, the resource broker may do one of the following: a) add the new operations to the existing set of bottleneck operations and optimize the entire bottleneck schedule or; b) provide options to the work order manager which reflect the impact of adding the new operations and let the master scheduler guide the scheduling process or; c) finite schedule the bottleneck automatically with the guidance of the weighted tardiness measure and the knowledge base.

After the resource brokers schedule the bottlenecks, the master scheduler then passes the package of work orders to a work order manager to further schedule the non-bottleneck routes. In this way, the CSS in planning mode produces a predicted schedule constrained by capacity at the bottleneck.

Once work orders are received by the work order manager, there are two ways to schedule them:

A pure optimization that chooses among work order scheduling options through the weighted tardiness function.

A negotiation that consults not only the weighted tardiness function but also the knowledge base, the resource broker, and possibly the master scheduler to determine a schedule which satisfies a variety of constraints.

Option one is provided and selected for speed. It will be useful for providing estimates for large numbers of work orders at a time in planning mode and quickly resolving large numbers of conflicts in the operational mode.

Option two is likely to be used most often. In option two, the work order manager identifies the resource brokers which manage each of the work centers that a work order is expected to pass through. The work order manager writes a contract for each operation in the work order and sends a "request for bids", also termed a "call", to the resource brokers identified. The brokers return bids trying to maintain a good work center schedule. The work order manager selects the best bid from each broker trying to build a good work order schedule. This process (as well as the option 1 process) is guided by the weighted tardiness objective. The call-bid process may go on a number of times before a satisfactory schedule is determined. At the end of the process, the work order manager "awards" work to the broker based on the best bids.

Planning mode queues are positioned at work centers and are filled with awards made during the planning mode. The primary function of the planning mode queue is to keep predicted schedules in waiting before releasing them to specific resources in the work center. "Release" means that this job will be performed next. As up to date information about the work load is received, the order of work in the queues may be shuffled. Later, in operational mode, the subset of queued work that is actually present and available for processing becomes the work center's dispatch queue. When a resource becomes available, the first job in the dispatch queue that can be assigned to that resource is released. In this way, the actual scheduling decision is made at the last possible moment with the best information.

The awards in queues are related to operations to be performed; each planned operation has an award. Inside the award, the prices generated by the weighted tardiness measure are stored as well as information related to other constraints. Awards are planned for particular resources but these assignments may change in the queue.

The prices available in the queue are used to guide the reshuffling of the queue but are not changed without re-planning.

When a foreman, area expediter, or master scheduler wants to see the work predicted for a resource, a simulation may be performed on the queue to show where work would be assigned if the order of the queue did not change. This simulation would produce Gantt charts for the resources and be displayed through the user interface.

There are four scheduling windows calculated in CSS. These are: the call window, the bid window, the award window, and the contract window. Call windows are the early start and late finish times calculated from the time map on the basis of forward/backward duration logic. These are the windows communicated to the broker when bids are solicited. Call windows are typically larger than the processing time required for the operations. The second type of window is the bid window. These are the windows returned by the brokers in response to a call from the WOM. Bid windows too can be larger than the duration of the operation. The bid windows are truncated by the WOM to form the award window, which has a length equal to the actual scheduled time for the opertion. The broker will reserve the award window for the operation. Finally, the contract window results from adding the slack time available to the operation into the award window. Although the broker has reserved the award window for the operation, no other tasks will be affected as long as the operation is performed within the contract window.

Figure 4:
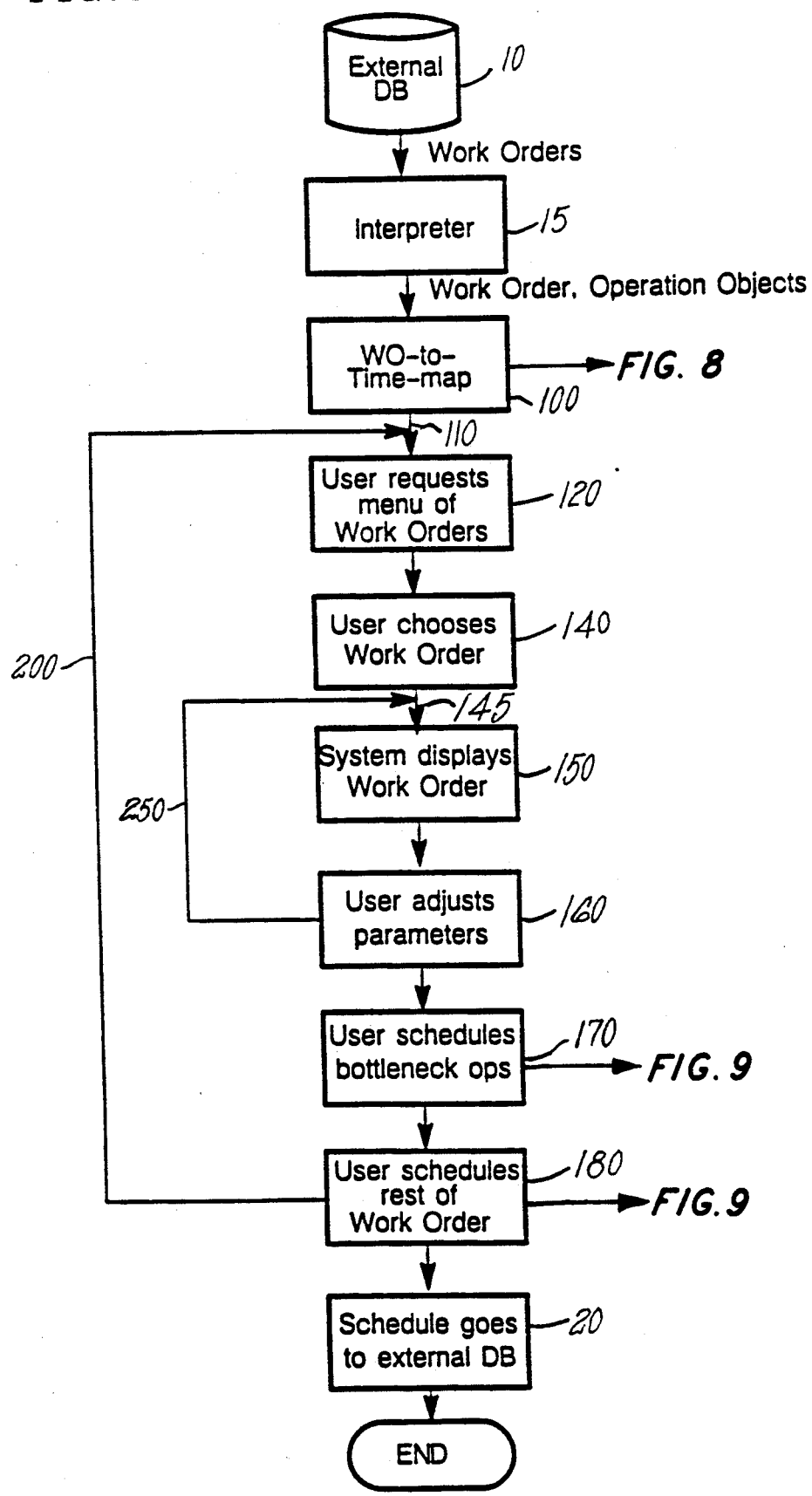
FIG. 4 illustrates the flow of the planning mode.

Referring now to FIG. 4, there is shown in overall chart the series of operations required to set up a work order.

Miscellaneous data is taken from an external data base 10. This may be a list of jobs to be scheduled, a list of standard times for various operations, a list of machines available, a list of work order frames for standard parts, or any other stored information. That data then passes through an interpreter routine indicated by box 15, which merely translates the data from the data base format into whatever format is chosen for the particular work order system.

The box labeled 100 is illustrated in more detail in FIGS. 8A-8G. In this operation, the work order information is used to generate a time map which is a way of representing the relations in time between different events, such as the start and finish of a machining operation. The time map and its associated search routine serves in this application to substitute for a code generating or logic searching engine. There will be so many possibilities for work order paths through a reasonably sized shop that it is impractical to code the information required for a work order, such as the sequence of operations, the time estimates, etc. In a production shop, where there are a relatively few parts to be worked on, it may be practical to go through and code specific routines for each part, but in a general purpose job shop the possibilities are so many that it is not practical to code and store a stock set of routines, nor is it practical to code a general purpose routine for computing all the time constraints among all the various possibilities.

The time map in this system is used to hold the data during the scheduling operation that is the heart of the planning mode. The main loop starts at point 110 after which the user requests a menu of work orders to be scheduled. He then chooses one work order from the menu and commences the actual scheduling operation. The skeleton of a work order is displayed on the screen and contains at least the earliest start date and the desired finished date specified by the customer. It will usually include a list of operations for that part, whether stored in the data base for a part that has been made before, or generated by the customer or the part designer. Each operation in the work order list must be assigned to a machining center or a shop resource, as it is called, and a tentative date must be set for the sequence of operations. In a good sized shop, there will be a number of possible routes that a part may take, depending on one or another general purpose machine, set of milling machines, etc., that is chosen to be used. There will, thus, be alternate paths through the shop that will be kept in the system and held for evaluation of the most effective route of scheduling until the last moment.

In block 160, the user adjusts the parameters based on his experience and stored data. For example, he may change the release date at which an operation is to be performed or the desired date at which it is to be completed, based on his view of the current work load as it may change from time to time. He may also specify nominal processing times for various operations, either taking them from stored information or using his own experience.

The system may use an artificial intelligence inference engine constructed according to standard principles to provide the possibility that the expertise of experienced operators may be expressed as an algorithm and used to automate the step. The system then loops through the different operations in the work order on feedback path 250 until this work order is scheduled as a first cut.

Block 170 illustrates a feature of this system in that when there are bottlenecks in the shop, whether constant or changing with time, the manager will then take one or more work orders and schedule the operation that must pass through the bottleneck. This is illustrated in more detail in FIG. 9. This procedure is included for the reason that bottleneck jobs by their nature will be the least flexible and it is advantageous to schedule them first and then schedule the jobs with greater flexibility around them. In the next box, the user passes the remainder of the work order on to the system for the automatic scheduling sequence that will be described later. This is illustrated in FIG. 10. The feedback loop 200 then returns back to point 110 to pass through the remainder of the work orders to be scheduled in this session. When all the work orders have been processed, then the data is transferred back to the external data base.

The main benefit from using the time map formalism in this application is in the two loops. When parameters are adjusted in loop 250, the change is not permanent, as would be the case in a special purpose code in which a model of the work order has been set up and parameters are over-written in order to test out a new assumption. As will be described later, this system features a separate module called the ATMS (for Assumption based Truth Maintenance System), which provides both for storage of assumptions with appropriate flags on them and also for an automatic process of checking that responses to queries and plans are made using the current assumption set. An advantage of this system is that, the path through the shop being known, the current values of the assumptions are automatically used in calculating the various scheduled times.

Likewise, in the outer loop 200, the time map eliminates the need for special purpose coding and its associated logic definition because the time map formalism can handle any possible path through the shop.

Figure 8:
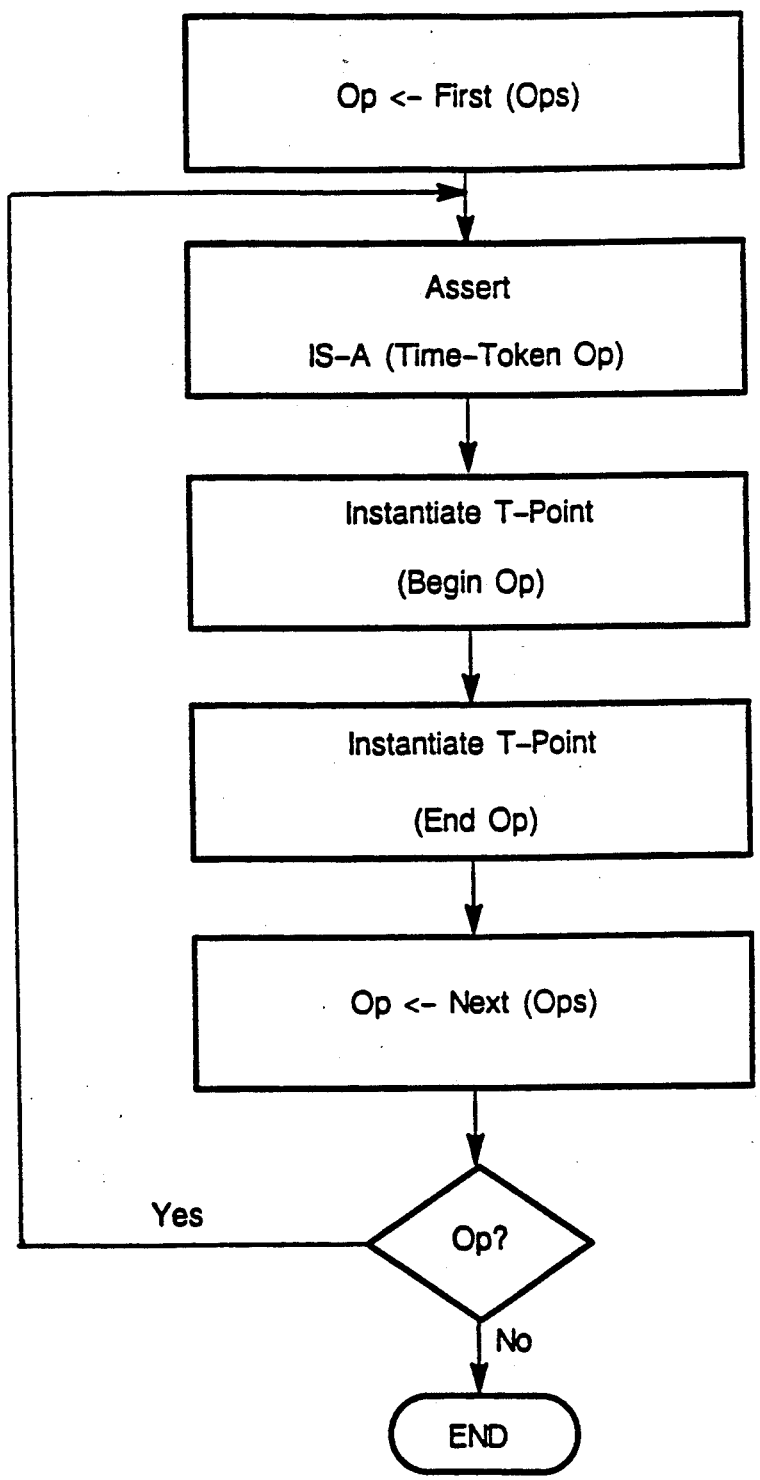
FIGS. 8A through 8G illustrate the steps in forming a time map.
Figure 8D:
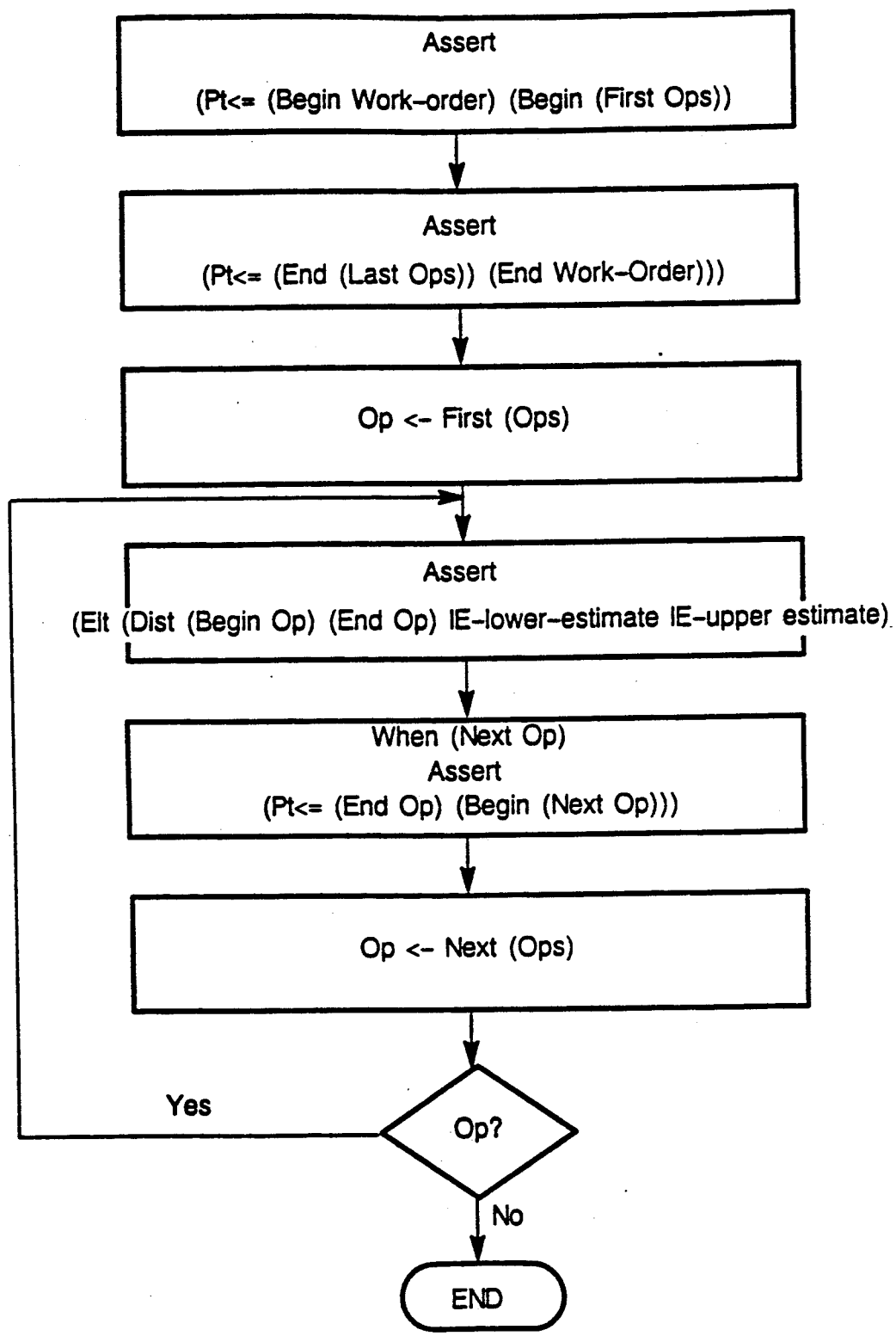
Figure 8E:
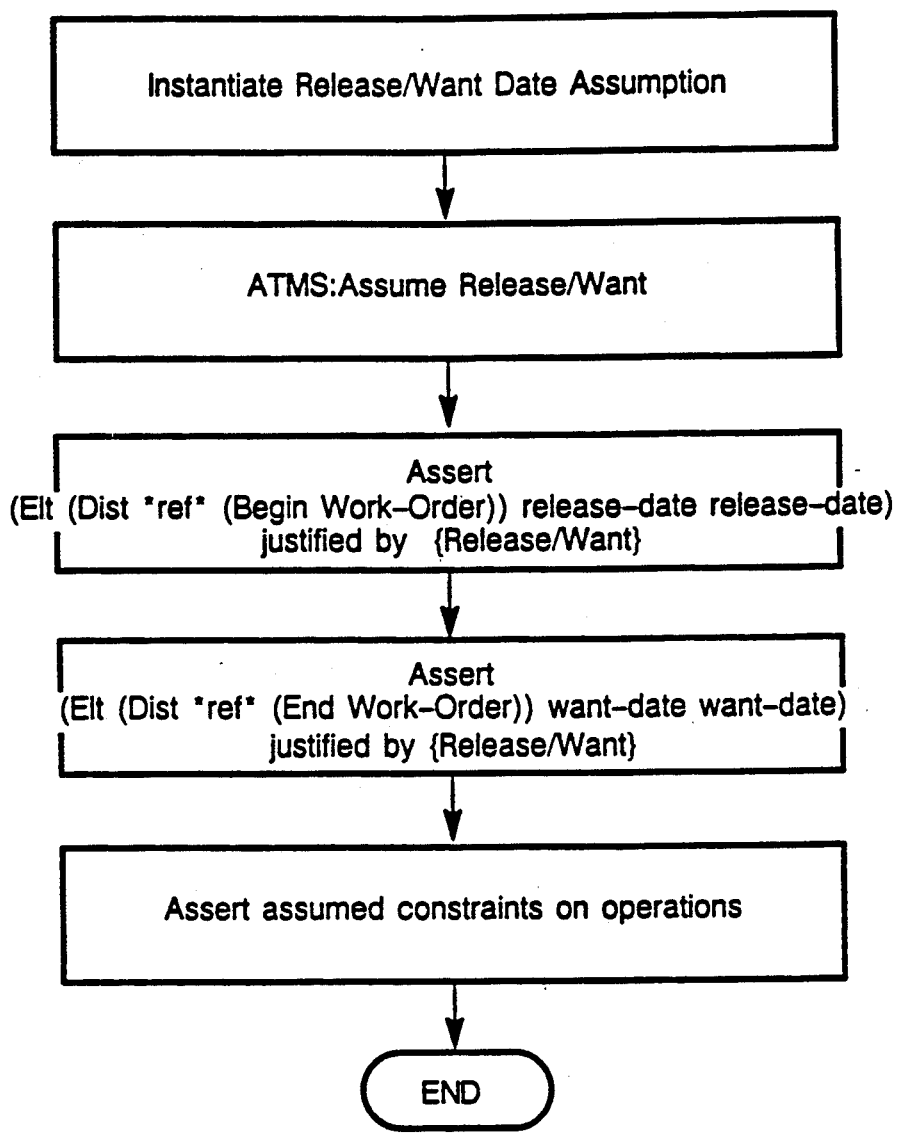
Figure 8F:
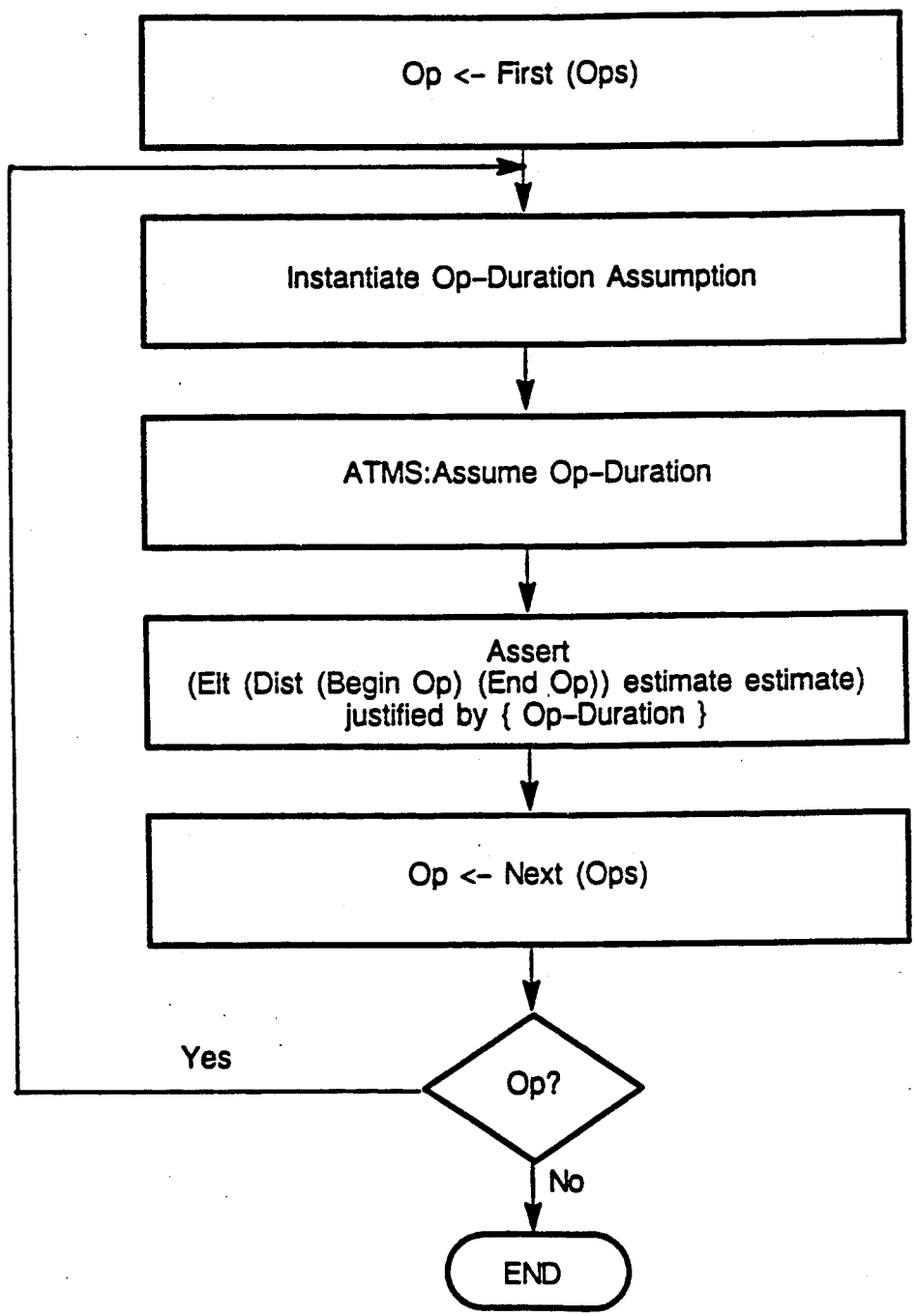

Referring now to FIG. 8A, there is shown an overall view of the process of converting the work order information to a time map. First, the time information for the overall work order is entered; then the time information for the various operations is entered, after which constraints that are known from the start are imposed on the relationship between the different operations; and, lastly, constraints that are peculiar to this operation or are changing in time, referred to as assumed constraints, are entered. The corresponding Figures to illustrates these blocks in more detail are 8B, 8C, 8D, and 8E, respectively. In 8B, the points are illustrated in more detail using terminology taken from the LISP programming language. First, the work order is classified as a "time-token", which means that it is a point that will be referenced and linked to other points. The start and ending times are inserted and a storage location for the path that will be searched through the time chart and a reference date are also defined. In FIG. 8C, next, the time information for each operation is inserted in a loop that does a similar operation by asserting that each operation will be a time token having a starting point. The diamond at the bottom of the loop tests for the presence of a further operation to be classified. In FIG. 8D, constraints such as those illustrated in FIG. 6A which are known from the start, such as the earliest possible starting date and last date the customer will accept are entered. In the loop in this Figure, the estimated times from manufacturing engineering, standard data books or prior experience are entered for each operation. In FIG. 8F, the assumed constraints are entered also to reference the position of this operation within the work order with reference to the arbitrary reference date that was previously entered.

Lastly, the same mechanism is applied to the different operations and also the assumed constraints or times are entered into the ATMS formalism as indicated by the curly brackets in the notation used here. This means that the numbers entered for these estimated constraints will be tracked by the ATMS system and updated so that any query or use of these numbers will always be done with the current values that are assumed.

Figure 9:
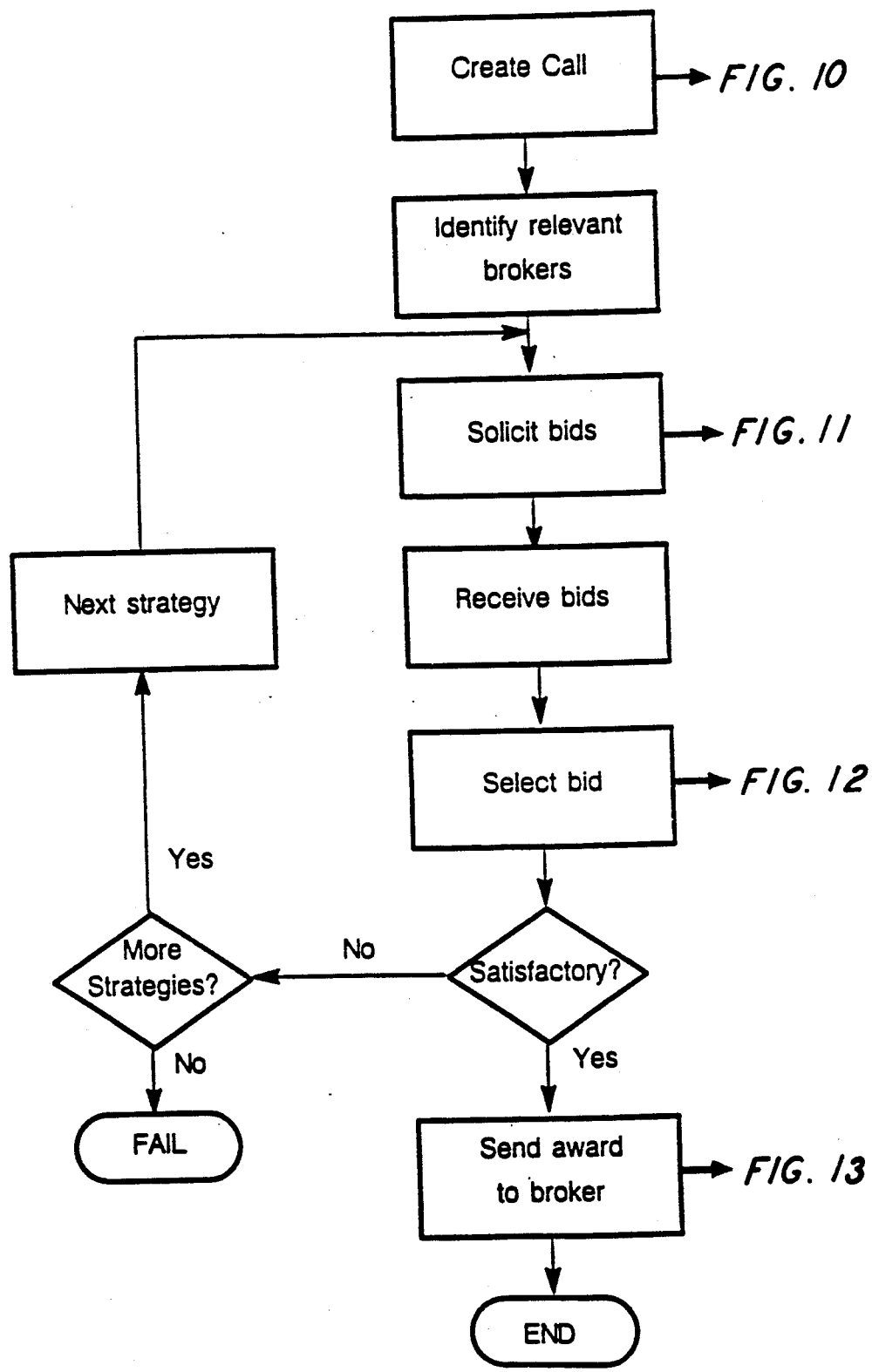
FIG. 9 illustrates the process of scheduling an operation.
Figure 10:
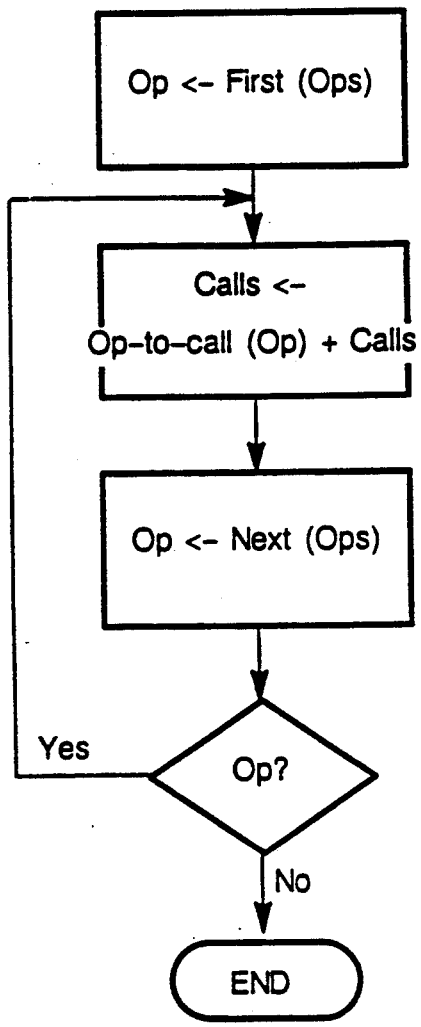
FIGS. 10-13 illustrate portions of FIG. 9 in more detail.

Referring now to FIG. 9, there is shown the sequence involved in scheduling an operation, particularly with reference to block 170 of FIG. 4. First, the standard formalism of a call to the brokers is generated, after which the relevant brokers are identified by matching the operation in question with a stored list of what brokers, i.e., shop resources, or machining centers are capable of handling that operation. In the main loop, brokers are queried to return one or more time windows within which their resources can perform the operation. Once bids are received, then one of them is selected according to one of several strategies that can be implemented in this system. If the bid meets the existing constraints on the work order, it is accepted and the broker is notified to store that time. If the bid is not satisfactory, then a different strategy may be applied and another set of bids solicited, if all strategies have failed then, of course, this operation cannot be scheduled within the current constraints and the shop manager is notified. He will presumably negotiate with the customer to accept a later delivery date or else turn down the job.

Once these bottleneck jobs have been scheduled, each work operation affected will have one fixed point for the bottleneck. The same procedure is then followed for the remainder of the work order using the same bid and select sequence shown in FIG. 9. The starting date for the later operations will, of course, be the end of the bottleneck operation. Similarly, the steps preceding the bottleneck operation will also be scheduled. FIG. 10 illustrates looping over the operations in the work order to set up the formalism for a call for each operation.

In the particular formalism used in this system, communications between the work order manager and the broker routines are cast in the particular form of a "transaction"

Figure 11:
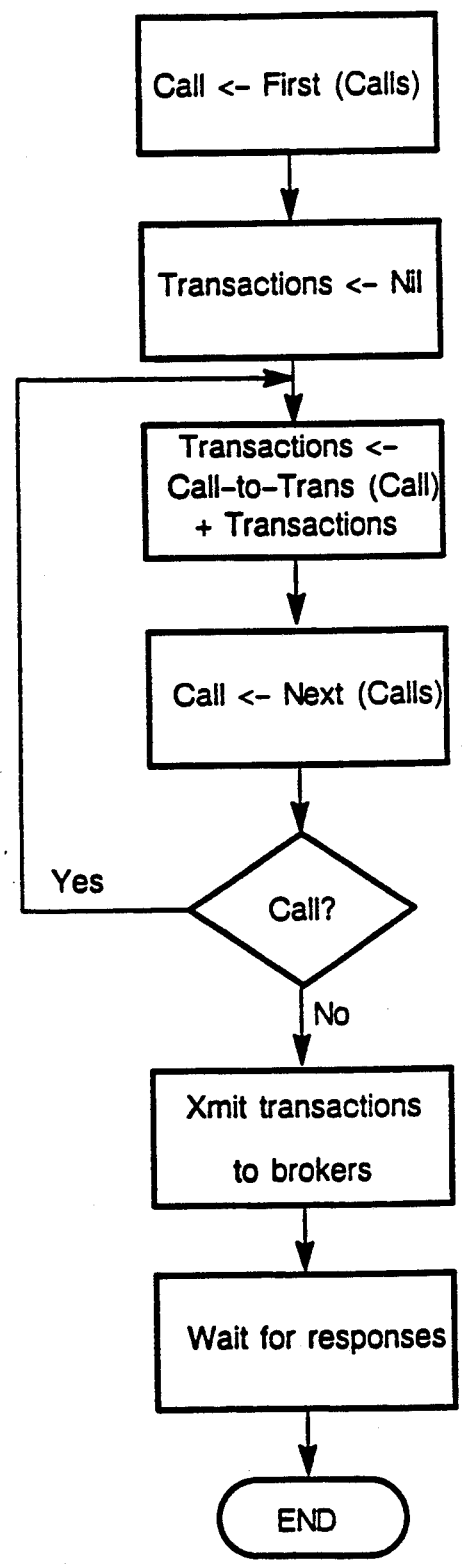

FIG. 11 illustrates the conversion of calls into the transaction formalism for the set of calls that were defined in FIG. 10 and transmission of the transactions to the brokers.

Figure 12:
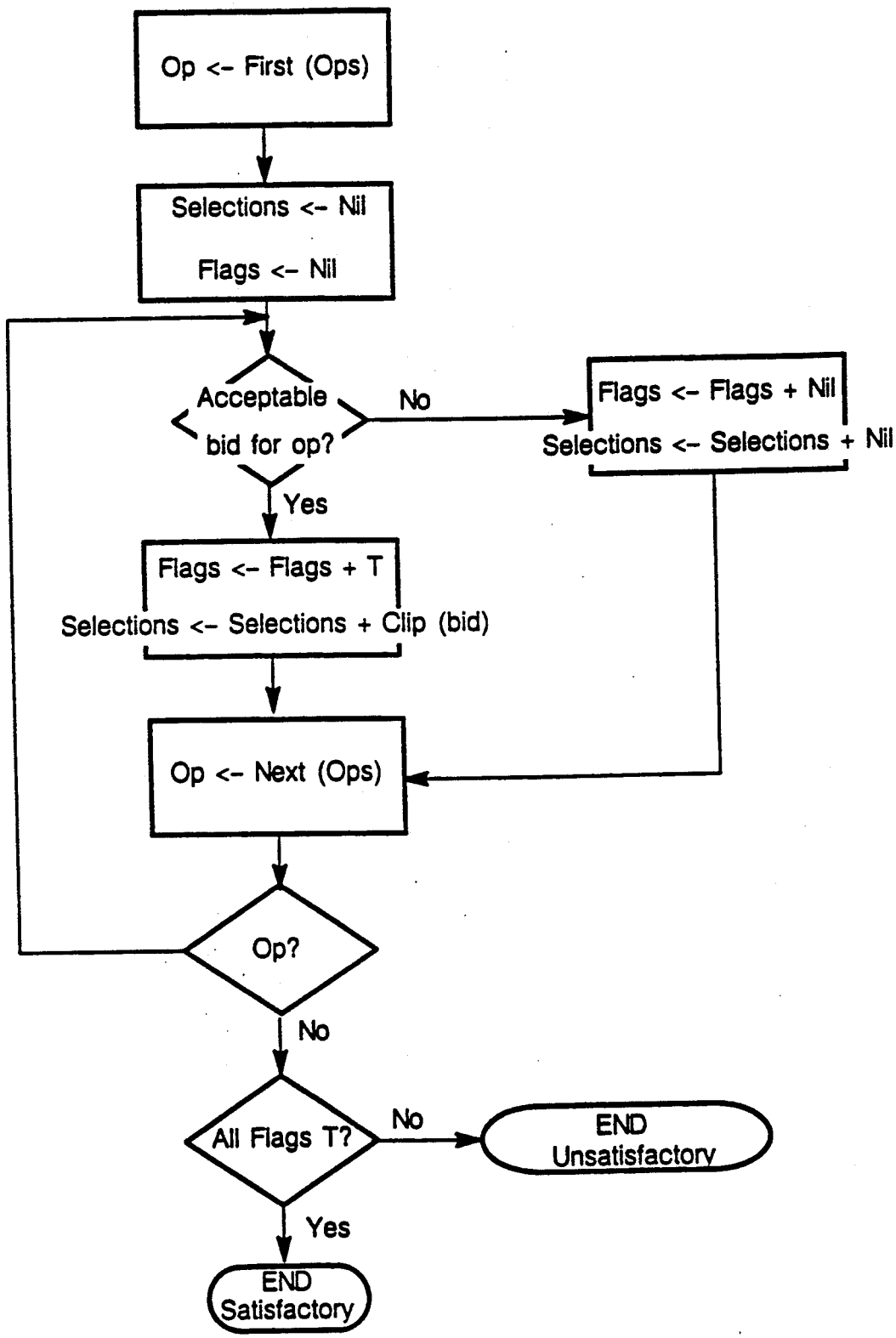
Figure 13:
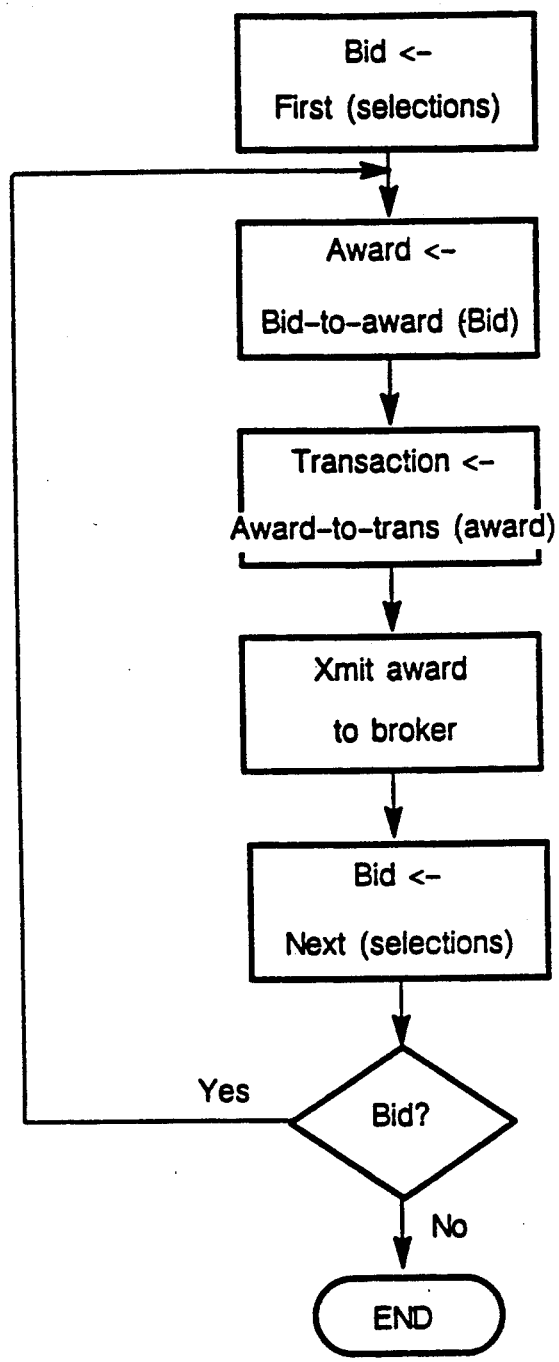

FIG. 12 illustrates the selection process in which the work order manager selects the best bid from a set of bids submitted by the brokers. In this Figure, the work order manager loops through the bids received, checks them for consistency with the constraints previously stored and sets a set of flags used for communication appropriately as to whether the bid is accepted or rejected. If all flags are true the bid will be marked as satisfactory. Once a set of satisfactory bids has been selected, then a similar process to that for bid solicitation is used in which the information is converted to the standard transaction format and then passed to the brokers. The brokers will then store the window sent to them by the work order manager and schedule other jobs around that window.

Figure 14:
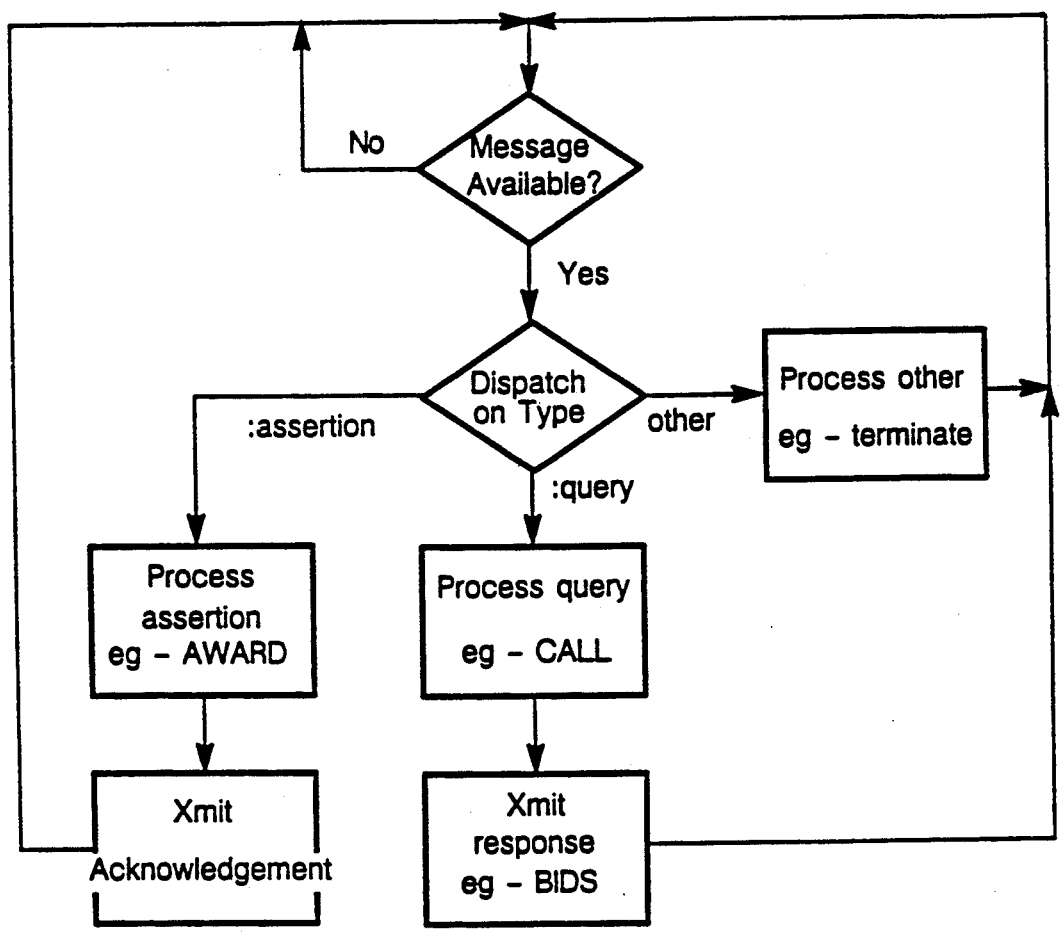
FIG. 14 illustrates the operation of the Broker routines.

Referring now to FIG. 14, there is shown an outline of the operations in with the broker routine engages. As a distributed entity, whether operating on a standalone workstation or as a routine within a larger system, it spends most of its time waiting to be called. When called, there are two main categories of operation; a query in which it is asked to present information such as a bid response or and assertion in which it is directed to store data such as a reserved time slot. Other processes such as responding to queries from a local operator (i.e., the shop foreman) to display the list of work in progress, the waiting queue of jobs waiting to processed, etc., are indicated in the box labeled other.

FIG. 15A illustrates the operation of a broker routine in responding to a call. There are three loops, one over time slots for the current machine; the next over the available machines that have the capacity to do the operation; and the last over the different strategies used by that broker. Typical strategies may be: try the present schedule; if unsuccessful, drop lower priority jobs in the same work order package; if unsuccessful drop unrelated jobs of priority three; etc. The windows that are will be found will be sorted by priority according to the broker's goals, usually to minimize the weighted tardiness function.

FIG. 15B illustrates an alternate broker using a LISP formalism in which the loops are generated automatically by the IF statements. This formalism is suited for embodiments the selection and/or prioritization are based on rules formulated according to artificial intelligence techniques such as those described in Yale University Research Report #443.

OPERATIONAL MODE

Once a schedule has been formulated by the planning mode it becomes the responsibility of the operational mode to execute it. Operational mode is charged with dispatching queued jobs to the work center, filling in the details of scheduled operations and responding to unforeseen events. Operational mode will quantify the impact of unforeseen events and try to contain the effect of change to the most limited scope possible. First the resource broker will attempt local recovery. In some cases there will be enough slack in the scheduled work to make recovery relatively painless. In other cases it will be necessary to invoke a partial replanning mode. In still other cases it may be necessary to perform a complete replanning.

The result of planning mode is a work center schedule that reflects the information available at the time the schedule was created. This schedule was created on the basis of the finite capacity of the work centers, predictions of resource availability and the job processing hours predicted by industrial engineering. Since the schedule reflects so many assumptions it is treated as an estimate at run time rather than as a prescriptive document. It is the responsibility of operational mode to refine this estimate by providing additional detail for tasks to be performed, specific resources assigned, and for the work pieces actually present and ready to be worked in the center.

Plan detailing refers to the additional knowledge that the local resource broker has about the tasks to be performed. For instance, a turning task viewed as atomic by the planning mode may be seen to consist of several subtasks by the operational mode. Each of these tasks may require a different class of operator. In such a case, the resource broker would perform a scheduling operation like that of the work order manager, sending out calls to "sub-resource brokers" and processing these responding bids in the same manner as the main WOM interacts with the resource brokers.

Operational mode is also responsible for deciding the sequence of work to be performed in the center. Although a nominal schedule has been formulated by planning mode, this schedule can be treated as an estimate at best. Operational mode must answer the question "what next?" when a resource is about to become available. The next job is chosen from among those actually present in the center and ready to be worked.

The next job to be worked is chosen on the basis of the same objective function used by planning mode in formulating the schedule. The dispatch decision is nothing more than selecting the job with the lowest cost (at this instant) from among those present at the center that can be performed on the resource that is becoming available. A short term predictive schedule for the work center can be computed in much the same way. To compute a local schedule a forward simulation is performed. First, the time at which the next resource will become available is predicted. Then the cost of releasing each job at this time is computed. The lowest cost job is scheduled for that time, removed from the list of jobs, and the process is repeated. This method has the advantage that the total cost of the work present at the center can be computed.

Another responsibility of operational mode is to respond to unforeseen events. Examples are machine failures, process overruns, unavailable raw material and so on. As shown in the figure, the holdups can originate from any level of the system. When a holdup code is signaled, recovery actions that are based on the particular holdup are initiated. The severity of the damage done to the schedule by the holdup varies and so the scope of the recovery actions must vary as well.

In some cases the cost of the operational event can be measured directly. For instance, if a resource becomes unavailable, a new schedule can be simulated with the resource removed from the capacity for the estimated duration of its outage. The cost of this new schedule can be compared to the cost of the previous schedule. In the case of delayed raw materials or predecessor operations the cost of the delay can be calculated on the basis of the new estimated completion date for the delayed task. The cost estimates produced will be sensitive to the predicted holdup duration so these predictions must be as accurate as possible.

In some cases it may be possible to adjust the local schedule to account for a holdup without affecting the work in other centers. This occurs when there is enough slack in the queued work to absorb the impact. Slack results when the affected work order does not lie on the critical path for its work order package. If there is enough slack available in the work center's queue for every operation to remain within its contract window then no external tasks are affected and no replanning outside of the local broker is required.

Even if the holdup affects more than one work order it might be possible, though less frequently, to contain the damage within each of the affected work orders. When work orders contain slack the WOM can slide operations forward in time within their contract windows without causing the work order as a whole to become late. That is, it may be possible to absorb the impact of the operational event with the slack time in the subsequent operations of the work order.

In some cases, the recovery approaches will not be possible. This is especially likely when bottlenecks are involved. In many cases operational events will be of such severity that full replanning will be required to minimize the cost. In this case the affected work orders will be identified and pushed through the automatic scheduling mode of the system to compute a new schedule. Important jobs that cannot be automatically rescheduled must be brought to the attention of supervision and these must be manually rescheduled or held.

The goals of the CSS in operational mode are to control the dispatching of work and to react, when necessary, to problems as they occur.

The primary decisions made in operational mode are releasing decisions and reacting decisions. The WOM has no responsibility for releasing decisions. Locally, the resource brokers manage the work queues in their workcenters. Globally, the release of work into the shop is controlled by the master scheduler.

CSS maintains three views of the work orders: the scheduling view, the shop view and the temporal view. The scheduling view looks at work orders abstractly as "tasks." The shop view looks at them concretely as a particular part manufactured in the shop. The temporal view looks at each work order as a time map: a set of points in time that are related by temporal constraints. CSS uses Frameworks (Reference), a frame-based representation and reasoning system to represent this information.

Scheduling View of Work Orders—The scheduling view of a work order contains the information used internally by the system. The work order is viewed as a task. Tasks have subtasks and supertasks that put the task in perspective with respect to the purpose for which it is being done. For instance, a work order is a task that must be performed to achieve the completion of its supertask which is a work order package. To achieve completion of a work order its subtasks which are operations must be performed.

Shop View of Operations—The shop view of a work order contains the information that relates the work order to its work order number, priority, want date, release date, process plan, part name and other information that defines its demand on the capacity of the shop.

Time maps are a technique for representing points in time and relating them with temporal constraints. The specific representations used for the objects that make up time maps can be found in Temporal Imagery: An Approach to Reasoning About Time for Planning and Problem Solving, Yale University Research Report # 443, Oct. 1985. and Temporal Database Management, Artificial Intelligence vol. 32, no. 1, 1987. Events or facts that persist over time are called "time tokens". In CSS work orders and operations are represented as time tokens in addition to their scheduling and shop representations. Time points are objects that represent any instant of time at which something of interest happens, for example, the beginning of a manufacturing operation or the completion time of a work order. Each time point contains a list of constraints that relate the time point to other points of interest. For instance, the time from the beginning to the end of a manufacturing operation is represented as a constraint FROM the point representing the operation's start TO the point representing the operation's finish. Temporal constraints in the time map can contain uncertainty. In general, two distances are kept for each constraint: the shortest possible and longest possible distance.

Figure 5:
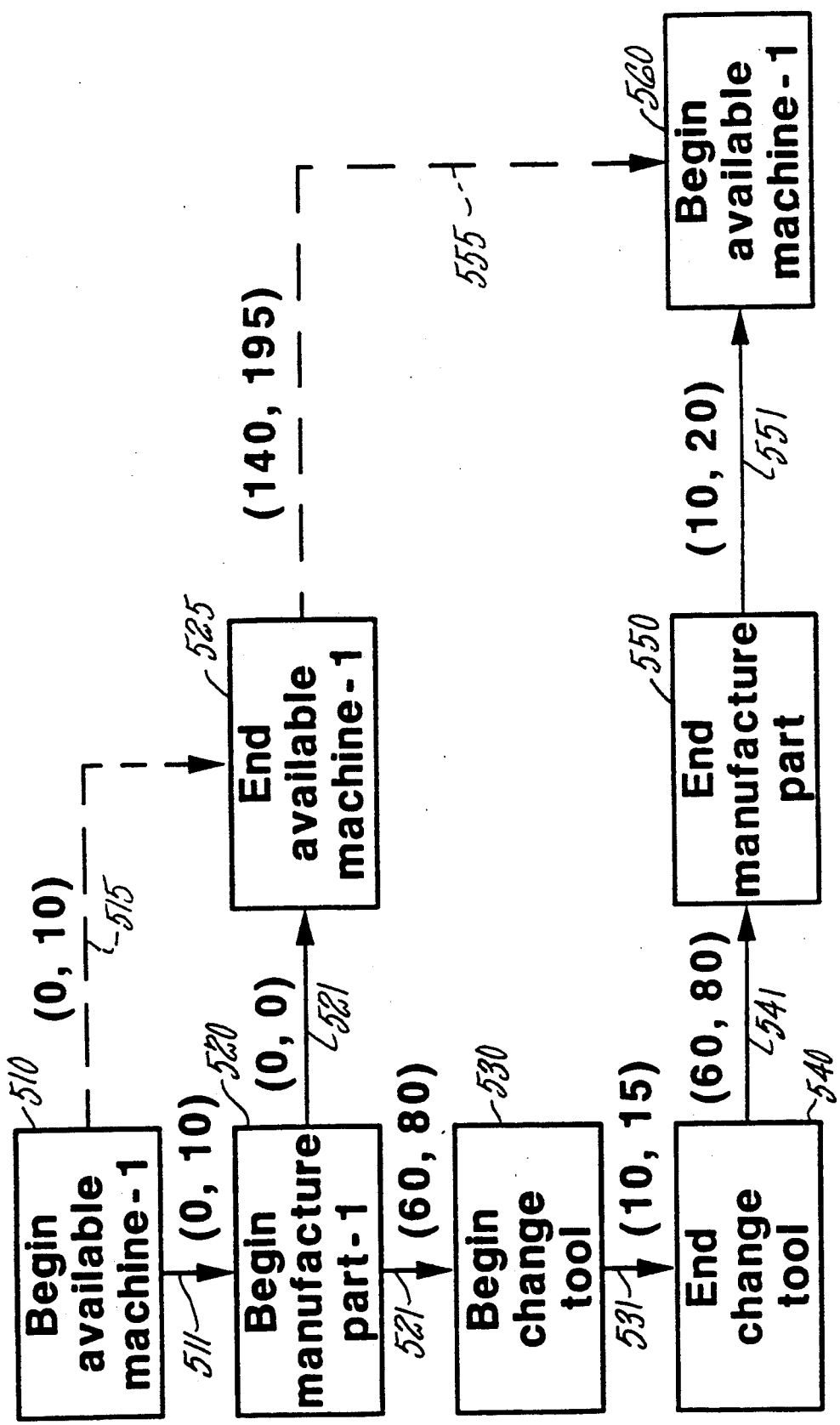
FIG. 5 illustrates a time map.

Time maps provide a general mechanism for reasoning about the temporal relations between events. Two important features of time maps are that constraints can be added at any time as long as they do not contradict previously known constraints, and that searches can be performed to answer arbitrary questions about the temporal relationship of time points. In FIG. 5 the constraint times indicated by the solid arrows 511, 521, 531, 541 and 551 have been entered into the time map. By traversing these links and summing the bounds along the way, the best known bounds between any two points can be computed. The computed bounds are represented by the dashed arrows 515 and 555 in FIG. 5.

In addition, constraints are defeasible. This means that constraints in the time map can appear and disappear based on the assumptions we are willing to make. For instance, the scheduling windows of operations change when different release or want dates are assumed. This is implemented by the ATMS system in the preferred embodiment of the invention.

In CSS, a time map is created for each work order when the user first requests a display of the work order. Each work order has a time map that is separate from all other work orders in the system. This method allows the time maps to be kept small so that searching them does not lead to slow performance. The time map for each work order is computed in three stages:

1. Time points that represent the start and finish of the work order and the start and finish of each operation are instantiated.

2. Temporal relations known a priori are asserted. These are facts like "Operation 2 must start after Operation 1, its predecessor, has completed" and "It takes between 2.5 and 3.5 hours to perform Operation 2." This is illustrated for one path through a time map in FIG. 6a.

3. Assumptions are made about the release and want date of the work order and about the actual processing times of the operations. (FIG. 6b)

Once the time map has been constructed (FIG. 6c) queries such as "what is the scheduling window for Operation 2?" can be answered. The use of assumptions allows consideration of many alternatives with regard to the release date, want date and processing times of the operations. Only the constraints that hold under the current assumptions are considered by the calculation. In CSS, the user can select among assumptions or make new assumptions from the user interface.

The ability to make and track assumptions is used by CSS in other ways as well. Not only can the user make assumptions explicitly as discussed just above, but assumptions can be made implicitly as well. A system component called the Assumption-based Truth Maintenance System (ATMS), as illustrated in an article by J. DeKleer titled An Assumption Based Truth Maintenance System, Artificial Intelligence vol. 12, no. 3, 1986, is responsible for computing the assumptions upon which the decisions made by the system rest. For instance, work order release dates are modeled as assumptions by CSS. If the release assumption fails to hold (i.e., the work order will be released later than expected) then the scheduling decisions based on the previous assumption must be reconsidered. Other assumptions tracked by CSS include that the job has not been canceled, that machines are operational and so on. When these assumptions fail to hold the affected decisions are identified and reconsidered, by use of "labels" carried in the ATMS.

An important use of time maps in CSS is as a substitute for generating code to be used in specific scheduling situations. A time map may contain several paths that represent alternate routes through the shop, in the case where a part can be manufactured in more than one resource center. Additionally, new constraints will be added to a time map as information is learned about the time taken in earlier steps and about other activities that will affect the part that the time map is representing.

Time maps are convenient for determining the constraints that the information known about the location of any event in time imposes upon all of the other events we are interested in. The representation is uniform so that all such constraints, whether resulting from pre-scheduling one or more bottleneck operations or from assumptions imposed by the user are handled the same way. Thus, no special purpose routines are required to handle such things as alternate routings, prescheduled operations, some types of operation duration changes and scheduling window changes when these are consistent with the release and want dates assumed for a work order.

The WOM gets information about the operations for the work order from an "instantiated process plan" that is stored with the work order. The instantiated process plan contains a list of the potential operations to be performed in the work order along with information about the processing relations between them. The process plans allow for operations to be sequential, parallel or disjunctive. Disjunctive routes represent alternative process plans that can be used by the WOM during scheduling. For instance, the WOM may choose an alternate routing to avoid the use of a heavily loaded machine.

When the WOM schedules an operation or a work order it does so by soliciting bids from resource brokers. The proper brokers to contact are found in the operation. Each operation has a broker profile, or list of brokers that should be interrogated by the WOM. The brokers found in the operation are not the actual brokers to be called, however. Instead, they are "virtual brokers." These virtual brokers are mapped onto the set of actual brokers through a mapping table. This allows the number of actual brokers and their particular operation assignments to vary as experienced with a particular facility shows to be best.

CSS uses a hierarchical representation for the activities performed in the shop. Each task to be performed can be part of a higher level task. It can also contain lower level tasks that must be performed to achieve it. CSS recognizes four types of tasks: 1) work order packages, 2) work orders, 3) operations, and 4) primitive actions. Work order packages are groups of work orders, work orders are groups of operations and operations are groups of primitive actions. Primitive actions are the most detailed level of task represented by CSS. Examples are to mount a fixture or drill a hole. Each task level, except the lowest level, primitive actions, is related to its lower level tasks by a plan. Operations contain "detail plans" that describe the primitive actions that must be done to achieve the operation and the precedence constraints between the primitive actions. Similarly, work orders have "process plans" that specify the manufacturing sequence for the part. Finally, work order packages have "task plans" that specify the temporal constraints between the work orders. Throughout CSS time maps are used to represent the temporal relations between activities.

Work order packages are intended to represent projects or assemblies that require many components that are to be manufactured separately. Just as a process plan is required to properly order the operations in a work order, a task plan is required to properly order the work orders in a work order package. The task plan for the work order package need not be as detailed as a process plan. The primary items of interest are the temporal constraints between the work orders.

Given a set of work orders, a task plan, and a want and release date for the work order package, the WOM can compute the want date for each work order. Some of the release dates will be fixed as well, but those work orders that have no predecessors will have flexible release dates. In addition, work orders which do not lie on the critical path for the work order package will have slack. It is desirable to maintain some slack for the work orders as a buffer against operational delays and events. Too much slack is undesirable, however, because of its adverse affect on WIP.

In addition to providing temporal information that allows the allocation of slack, the work order package also contains project, customer and business goals that the work order package supports. A basic design element of CSS has been the hierarchical modeling of tasks and subtasks. It is desirable for the temporal representation, that is, the time maps to be modeled hierarchically as well. For example, a time map that describes a work order package may be a network of work order time maps that are in turn a network of operation time maps that are comprised of the primitive actions that are done to manufacture the parts.

One approach to making the time maps hierarchical is to allow the use of composite constraints. Earlier, constraints between time points were described as a link FROM one point TO another that contained a lower and an upper bound on the distance between them. A composite constraint between the points would represents the lower and upper bounds as the lower and upper bounds between two points that are contained in another, subordinate, time map. When a composite constraint is encountered by the time map search routines, the process recurs and traverses the subordinate time map to compute the lower and upper bounds. When control returns to the higher level the search continues.

Resource brokers are the CSS agents that represent the resource centered view of scheduling. Each resource broker controls the schedule for a particular shop workcenter or collection of workcenters. The brokers must accurately represent the finite capacity and unique attributes of the resources under their control. The brokers must also have the ability to answer questions about their resources including their scheduled work load and processing capabilities.

One particularly important query that the brokers must respond to is a call issued by a work order manager. The call is a request by the work order manager for scheduling options for a particular task. All brokers must be capable of responding to a call by producing bids that represent the possible slots for performing the task in the broker's workcenters.

Brokers are also responsible for computing and maintaining the evaluation function values for each resource over time. These costs, based on weighted tardiness, are used throughout the system to provide a uniform evaluation criterion for comparing scheduling options.

To formulate bids, the resource brokers will minimally require information about resources, operations, and schedules. The brokers must maintain a complete list of the resources under their control. Although machines and people represent the most common types of resources, others such as tools, fixtures, furnace, table, shelf and floor space, forging dies and disposable tooling must also be represented.

Each resource broker will have a dedicated set of scheduling strategies. These strategies detail the types of modifications that can be made to the existing schedule to accommodate new work or to adjust existing work in response to new information. The resource selection strategies are used to limit the number of resources considered by the broker to perform a particular task. Resources can be limited by matching their processing capabilities against the process requirements of the operation to be performed. This constraint will be most effective if detailed information about the resources and operations is available. If this information is available then better decisions can be made at planning time resulting in a higher probability that the schedule can be successfully executed at run time. In addition, this level will be the focal point for customizing the behavior of the resource broker to more accurately model the actions of each workcenter.

When the work order manager sends a call to the brokers it will also provide information about the global policy in effect in the shop and about the importance of the operation to be scheduled with respect to the business goals of the company. Each broker must have the means to resolve scheduling conflicts in a way consistent with this information. The conflict resolution strategies of the brokers will define the specific actions that the broker should take when demand on its resources exceeds their capacity. A wide range of scheduling strategies must be available to each broker so it can react to different situations by applying rules that are specifically tailored to the resources it manages.

The scheduling strategies define the actions that the broker can take to modify the existing schedule to fit in a new job. Scheduling strategies make use of scheduling primitives which are the elementary actions that can be performed by the broker to modify existing schedules. Scheduling strategies are selected and applied singly or in combination by "metastrategies".

The scheduling primitives define actions that perform very local scheduling modifications. These primitives perform the following functions:

1. Unschedule a previously scheduled operation.
2. Move the schedule for an operation forward or backward in time.
3. Reassign a scheduled operation to a different resource.
4. Assign overtime to a new or scheduled operation.
5. Split/combine scheduled entities between resources.

The brokers must also have detailed knowledge about the capabilities and limitations of each of the resources under their control. This knowledge accounts for the individual attributes that uniquely define a resource and determine if it can satisfy the job requirements specified by the work order manager. Examples include:

1. Machine characteristics—Machine function/capacity, table size, NC/Tool changer capability, Probing Inspection capability, Machining accuracy, and intangibles such as operator preference and machine flexibility.
2. Operator characteristics—Skill, grade and training level, speed, accuracy, shift/overtime availability, and intangibles such as work preference and machine preference.
3. Tool/Die characteristics—Part applicability, machine compatibility.
4. Space characteristics—Shape, dimensions, volume, weight.

Further, knowledge of temporary resource loss should be taken into account by the broker when it formulates bids for the work order manager. Examples of temporary resource loss include:

1. Machine loss—preventive maintenance, hardware modification, relocation, extended loss due to breakdown.
2. Personnel loss—vacations, holidays, training, extended sick time.
3. Tool/Die loss—recalibration, modification repair.

A design objective for CSS has been to allow the development and implementation of many different types of resources brokers. The rationale is that no single style of broker is appropriate for all of the diverse shop areas. CSS provides the overall architecture and communication protocol to integrate heterogeneous brokers into a cohesive system. As discussed above, workcenters can be managed as either infinite or finite capacity. The CSS system design allows both finite and infinite capacity resource brokers to be implemented in any appropriate way, as long as they conform to the overall architecture. Primarily, this means that they must support the call-bid-award paradigm.

In the operation mode, the resource broker will require at least the process, type and processing duration of the operation to be scheduled. If more detailed process information is available, the resource broker can use it to more closely match the resources with the processing needs of the operation. For instance, if a detail plan is available that provides information about the subtasks required to perform the operation, the resource broker may be able to plan an appropriately skilled operator for each subtask.

The brokers also require access to their scheduling commitments. The level of detail required depends on whether the resources under the brokers control are to be managed as infinite or finite capacity resources. Centers that are truly infinite capacity will require little knowledge of their prior commitments. However, from a data requirement point of view a problem occurs when a workcenter that had been managed as infinite capacity becomes a bottleneck and must now be managed to finite capacity. The transition from infinite to finite capacity will require that all previous schedule commitments be available in as much detail as if the workcenter had been scheduled to finite capacity all along.

Further, specific response to conflicts vary from workcenter to workcenter. For instance, in a workcenter with very low setup costs job preemption may be a viable strategy for fitting a hot job into the schedule.

The Cooperative Scheduling System will use the weighted tardiness measure as its primary evaluation function at all levels of the system. When the broker formulates bids each bid will contain a cost based on the weighted tardiness of both the operation itself and on the operations that would be impacted by awarding this bid. Any factors that affect the processing time of the job are easily incorporated into the weighted tardiness measure. For instance if the job's duration can be reduced by avoiding a setup change this fact will be reflected in the cost computed for the job on the resource with the proper setup.

Resource schedules as a whole can be evaluated using the weighted tardiness measure. One approach is to forward simulate the execution of the schedule, summing the cost of each job as it released for processing in the simulation.

The resource broker will assume different forms and levels of complexity based on the relative workload in a particular workcenter. Two levels of differentiation can be distinguished: 1) finite vs. infinite capacity, and 2) methods of finite capacity representation.

Finite vs. Infinite Capacity— The first level of differentiation isolates those workcenters whose resources have a historical record of being non-bottleneck and are expected to remain unchanged in the long run. These workcenters shall be represented as a true infinite capacity resource with a standard queue time. The remaining workcenters will be modeled using finite capacity representations whose complexity and capability will vary depending on the level of bottleneck activity within the workcenter. Finite capacity workcenters may be categorized as being either bottleneck centers or potential bottleneck centers by setting a threshold based on experience on the total weighted tardiness function of all the projects scheduled for the center. The system then can be switched to the bottleneck method for that workcenter.

Finite Capacity Workcenters—Potential bottleneck workcenters are those whose workload 1) fluctuates enough to prohibit the use of an infinite capacity representation and 2) is not large enough to create a persistent bottleneck to associated workcenters. Workcenters whose workload occasionally spikes to create short term bottlenecks will be considered as potential bottlenecks. These workcenters can be managed by brokers that operate predominantly in hands-off mode.

Resource brokers are also responsible for adjusting the workcenter loading queues in response to new or changing workcenter information. The response of the resource broker to discrepancies between the current workcenter schedule and the actual workcenter operation will be categorized according to severity and resolved accordingly. When operational events occur that change the capacity of the workcenter, the expected completion time for the queued work will change. New completion times can be computed using the forward scheduling simulation described above. The cost of the revised schedule in terms of the weighted tardiness measure can also be calculated. The schedules of work that is not yet queued can be affected as well.

Schedule variations have random aspects and sometimes tend to cancel each other out. CSS will take advantage of this by tolerating a level of fuzziness at the workcenter level and providing a damping influence on schedule readjustments at the resource broker level. This damping will provide a control on the generation of continuous oscillations of the CSS by preventing trivial adjustments as a result of every nonplanned workcenter event.

For events that constrain resources in excess of planned activities, a resource conflict list will be generated that details jobs which are in conflict with the existing workcenter plan. The magnitude of these conflicts, as well as the combined magnitude of the entire list will be continuously monitored. Job or list magnitudes above a threshold will initiate corrective actions at the broker level to reduce the size of the list. The resource conflict threshold will be multidimensional to account for different types of resource conflicts and will be defined and adjusted on a workcenter dependent basis.

Events that free up resources prematurely or otherwise increase resource availability will form an excess capacity list. Continuous comparison between the resource conflict and excess capacity lists will be used to identify local adjustment opportunities. When a match can be made that eliminates entries from both lists the workcenter can be kept more closely on the original plan. As in the case of the resource conflict list, the magnitudes of the excess capacity events and the combined magnitude of the entire list will be continuously monitored for potential corrective action at the resource broker level.

Because the resources and operations can be modeled in as much detail as necessary to represent their requirements and capabilities, operations can be assigned to the most appropriate resource. For instance, if tolerance information is available it may be possible to assign a faster, but less precise resource to the job in preference to a slower but more precise one. This knowledge can also be used to limit the number of resources considered for a task. This results in increased computational efficiency because the set of preferred resources will be smaller than the set of all possible resources.

As with resources, CSS maintains two views of operations: the scheduling view and, the shop view. The scheduling view looks at operations abstractly as "tasks" while the shop view looks at them concretely as a particular type of operation.

Scheduling View of Operations—The scheduling view of an operation contains the information used internally by the system. In this view, an operation is seen as an abstract task. Tasks can have subtasks and supertasks that put the task in perspective with respect to the purpose for which it is done. For instance, an operation task is performed to achieve the completion of its supertask which is a work order. To achieve completion of an operation, its subtasks which are primitive process tasks must be performed.

Shop View of Operations—The shop view of an operation contains the information that relates the operation to its route number, operation type, shop workcenters, and other information that defines its processing requirements. CSS represents several major classes of operations including: office operations, support operations, process operations and production operations. Each of the major classes has subclasses that further define the attributes allowed for the operations. For instance, an office operation can be a design operation or a planning operation. Process operations are heat treat, drilling, milling turning and so on.

As described above, any attribute of the operation can be used to constrain the set of resources considered to perform it.

One important attribute of some process operations is the ability for them to contain detail plans. Detail plans provide information to the resource broker about the detailed steps that are necessary to achieve the operation. These detail plans fall naturally into the task/subtask hierarchy that CSS maintains. The time map representation is used at all levels of the hierarchy to maintain information about the expected duration and temporal relations between tasks.

It is the resource brokers responsibility to maintain the list of scheduling commitments that it has made on behalf of its resources. This list is maintained as a list of reservations that reflect the contracts negotiated by the broker with the work order manager. The reservation list is examined by the broker at planning time to compute bids for the work order manager and to respond to requests for capacity and load information. At schedule execution time, this representation is of little interest because the focus of attention has shifted to the brokers dispatch queue.

Reservations are the formalism used by CSS to represent the schedule commitments made by the resource broker. Each resource has a list of reservations. Each reservation contains information such as its start time, duration, and the job to which it applies.

When the broker computes bids it examines the reservation lists for the applicable resources. If there is a gap in the reservation list long enough to process the operation within its call window the broker can return a no impact bid. If no such interval exists, the broker must examine its reservations to find a bid with impact according to the policy guidelines provided in the call. Once the broker has supplied bids to a work order manager it must lock its reservation list so that it does not provide the same bids to other callers. Finally, when the work order manager awards one of the bids the broker is responsible for updating its reservation list to reflect the new commitment. If the work order manager decides not to accept any of the broker's bids, the broker will need to be notified of this so it can unlock its reservation list.

The CSS system uses the time map formalism to represent the committed and available time slots on each resource. In the time map, propositions such as "Lathe 1230 is available" are given temporal extent by associating a beginning and end point with the proposition. The proposition just mentioned holds for the period of time that starts at its beginning point and ends at its end point. The duration and exact location of this interval in time are determined by the constraints that are in effect in the time map.

The queue of work at the workcenter will be represented as a list of contracts. The contracts will represent the work present and available to be worked at the center. The queue will be used to compute short term schedules and to answer the "what next?" question. It will be reordered based on operational events.

The examples above have been illustrated with a machine shop, but the system also includes part design as one of the functions supported. Thus, the term "workpiece" includes paper being drawn on by a draftsman (or a computer that is running a CAD program) and the operations may be drawing operations. Similarly, the system could be used in the drafting room of an architecture firm to manage the sequencing of drawings for a building; or in an insurance company to manage the flow of claim processing. Thus the term "job shop" or "machine shop" includes other organizations.

No particular form of hardware is required for system operation. The preferred embodiment was designed with a distributed environment in mind, in which the BRO routines would be on personal computers or workstations, but it would work equally well with a set of terminals connected to a mainframe computer. Similarly, no particular software language is required. The illustrative embodiment was written in a variety of computer languages, in part by historical accident and in part by programmer preference. Those skilled in the art will readily be able to generate their own code or use commercial packages to produce the results described above.

It should be understood that the invention is not limited to the particular embodiments shown and described herein, but that various changes and modifications may be made without departing from the spirit and scope of this novel concept as defined by the following claims.

We claim:

1. In a shop having a number of shop resources for doing jobs by performing operations on workpieces, each workpiece following a path through at least two shop resources, said path being specified by a work order schedule list characteristic of said job and maintained within computing means and specifying the sequence, location and time of a predetermined set of operations on a workpiece in a predetermined set of at least two shop resources, said computing means including a data processing system comprising WOM means for scheduling operations in at least two shop resources, based on data received from a resource set of at least two BRO means, each BRO means being associated with a shop resource, the method of ordering a work order schedule list for at least one job in a shop, in which:

for at least one job, said WOM means passes a call specifying an initial resource operation for said job to an initial relevant BRO sub set of at least one BRO means for an initial resource operation;

for said initial resource operation at least one BRO means returns a bid to said WOM means specifying at least one suggested time slot for said initial resource operation associated with that BRO means, thereby forming a set of suggested time slots for each resource for said initial resource operation;

said WOM means selects one bid for said initial resource operation in accordance with a predetermined strategy, thereby scheduling an operation time for said selected initial resource operation;

said WOM means then repetitively passes calls to a subsequent relevant BRO sub set of at least one BRO means for each other operation in said predetermined set of operations and selects bids returned from said subsequent relevant BRO set, thereby defining a set of scheduled time slots for said at least one job; and said computer means then calculates a completion date for said job, characterized in that:

said method of ordering a work order schedule, including said steps of defining a set of scheduled time slots, is performed in a planning mode;

said set of scheduled time slots are contained within a corresponding set of contract time slots having an extent in time at least as great as said set of scheduled time slots and a first BRO means reacts in an operations mode to shop events occurring in its associated shop resource by moving a scheduled operation time within a corresponding first contract time slot from an ineligible scheduled time slot to an eligible time slot, whereby for a first class of shop events said BRO means can adjust the operations of said associated shop resource without affecting the operations of other shop resources or of other jobs; and for shop events having a schedule impact greater than the extent of said first contract time slot, said system causes that BRO means associated with the next operation in said work order schedule list to move the scheduled time slot of said next operation within its corresponding contract time slot, whereby for a second class of shop events the execution of other jobs is not affected; and for shop events having a schedule impact greater than the extent of the contract time slots of associated BRO means, said system identifies a conflict set of jobs affected by said shop event and causes said WOM means to pass calls to and select bids from those BRO means associated with operations in said conflict set, whereby said system reschedules those jobs affected by said shop event.

2. A method according to claim 1, further characterized in that: at least some of said BRO means contain means for maintaining an input queue of workpieces ready to be worked on and said BRO means selects, in said operations mode, a next workpiece based on a price function dependent on a delay quantity representative of the difference between an initially scheduled finish date and a currently estimated finish date.

3. A method according to claim 1, further characterized in that said system further comprises assumption means for maintaining a set of current assumptions about work order schedule lists;

at least some of said BRO means contain means for maintaining an input queue of workpieces ready to be worked on; and said BRO means selects, in said operations mode, a next workpiece based on data obtained from said set of current assumptions.

4. A method according to claim 2, further characterized in that said system further comprises assumption means for maintaining a set of current assumptions about work order schedule lists; and said BRO means selects, in said operations mode, a next workpiece based on data obtained from said set of current assumptions and included in said price function.

5. In a shop having a number of shop resources for doing jobs by performing operations on workpieces, each workpiece following a path through at least two shop resources, said path being specified by a work order schedule list characteristic of said job and maintained within computing means and specifying the sequence, location and time of a predetermined set of operations on a workpiece in a predetermined set of at least two shop resources, said computing means including a data processing system comprising WOM means for scheduling operations in at least two shop resources, based on data received from a resource set of at least two BRO means, each BRO means being associated with a shop resource, the method of ordering a work order schedule list for at least one job in a shop, in which:

for at least one job, said WOM means passes a call specifying an initial resource operation for said job to an initial relevant BRO sub set of at least one BRO means for an initial resource operation;

for said initial resource operation at least one BRO means returns a bid to said WOM means specifying at least one suggested time slot for said initial resource operation associated with that BRO means, thereby forming a set of suggested time slots for each resource for said initial resource operation;

said WOM means selects one bid for said initial resource operation in accordance with a predetermined strategy, thereby scheduling an operation time for said selected initial resource operation;

said WOM means then repetitively passes calls to a subsequent relevant BRO sub set of at least one BRO means for each other operation in said predetermined set of operations and selects bids returned from said subsequent relevant BRO set, thereby defining a set of scheduled time slots for said at least one job; and said computer means then calculates a completion date for said job, characterized in that:

said method includes both a planning mode and an operations mode, in which planning mode said steps of developing a schedule are performed;

including the steps of scheduling through a bottleneck shop resource in which a bottleneck operation is performed by first scheduling for each job having said bottleneck operation an operation time having a bottleneck start time and a bottleneck finish time through said bottleneck and subsequently scheduling earlier operations in said work order list to meet said bottleneck start time and scheduling later operations in said work order list to begin after said bottleneck finish time; and said WOM means contains at least two strategies for scheduling bottleneck operations and selection means for selecting a second strategy in the event of failure of a first strategy to schedule jobs within a set of applicable constraints.

6. A method according to claim 5, further characterized in that said system includes bottleneck identification means for identifying bottleneck shop resources as a function of scheduled operations above a predetermined threshold, whereby said WOM performs bottleneck scheduling on a time-varying set of bottleneck shop resources.

7. A method according to claim 6, further characterized in that said system further comprises assumption means for maintaining a set of current assumptions about shop resources and work order schedule lists; and said bottleneck identification means identifies bottleneck operations using data obtained from said assumption means.

8. A method according to claim 5, further characterized in that said method of ordering a work order schedule, including said steps of defining a set of scheduled time slots, is performed in a planning mode; said set of scheduled time slots are contained within a corresponding set of contract time slots having an extent in time at least as great as said set of scheduled time slots and a first BRO means reacts in an operations mode to shop events occurring in its associated shop resource by moving a scheduled operation time within a corresponding first contract time slot from an ineligible scheduled time slot to an eligible time slot, whereby for a first class of shop events said BRO means can adjust the operations of said associated shop resource without affecting the operations of other shop resources or of other jobs; and for shop events having a schedule impact greater than the extent of said first contract time slot, said system causes that BRO means associated with the next operation in said work order schedule list to move the scheduled time slot of said next operation within its corresponding contract time slot, whereby for a second class of shop events the execution of other jobs is not affected; and for shop events having a schedule impact greater than the extent of the contract time slots of associated BRO means, said system identifies a conflict set of jobs affected by said shop event and causes said WOM means to pass calls to and select bids from those BRO means associated with operations in said conflict set, whereby said system reschedules those jobs affected by said shop event.

9. In a shop having a number of shop resources for doing jobs by performing operations on workpieces, each workpiece following a path through at least two shop resources, said path being specified by a work order schedule list characteristic of said job and maintained within computing means and specifying the sequence, location and time of a predetermined set of operations on a workpiece in a predetermined set of at least two shop resources, said computing means including a data processing system comprising WOM means adapted for scheduling operations in at least two shop resources, based on data received from a resource set of at least two BRO means, each BRO means being associated with a shop resource, the method of ordering a work order schedule list for at least one job in a shop, in which:

for at least one job, said WOM means passes a call specifying an initial resource operation for said job to an initial relevant BRO sub set of at least one BRO means for an initial resource operation;

for said initial resource operation at least one BRO means returns a bid to said WOM means specifying at least one suggested time slot for said initial resource operation associated with that BRO means, thereby forming a set of suggested time slots for each resource for said initial resource operation;

said WOM means selects one bid for said initial resource operation in accordance with a predetermined strategy, thereby scheduling an operation time for said selected initial resource operation;

said WOM means then repetitively passes calls to a subsequent relevant BRO sub set of at least one BRO means for each other operation in said predetermined set of operations and selects bids returned from said subsequent relevant BRO set, thereby defining a set of scheduled time slots for said at least one job; and said computer means then calculates a completion date for said job, characterized in that:

said system generates a time map for said job containing representations of at least some of said resource operations, including specification of a start time and an end time and linking information connection sequentially ordered resource operations, and including at least one path through said time map from a job start time to a job end time;

said system further adds to said time map resource operation constraints on said work order schedule list for said job, said constraints having an uncertainty specified by a lower time and an upper time and being linked to an associated resource operation;

said system further includes a search routine that examines paths through said time map and selects the most specific path, having the least uncertainty, whereby additional information including delays, changes in resource may be entered into said system by putting more specific times into said time map; and said system may extract information by searching for that path through said time map having the least uncertainty, whereby timerelated information may be extracted from said system.

10. A method according to claim 9, further characterized in that said system further comprises assumption means for maintaining a set of current assumptions about work order schedule lists and said assumption means are linked to said time map, whereby said time map reflects said set of current assumptions.

11. A method according to claim 9, further characterized in that said system includes subordinate time maps, each associated with a shop resource and containing associated shop resource data and being linked to a predetermined location in said time map, whereby said search routine searches from said predetermined location through said subordinate time map and returns to said time map, thereby reflecting data in said subordinate time map.

* * * * *